(12) United States Patent
Yan et al.

(10) Patent No.: US 11,218,945 B2
(45) Date of Patent: Jan. 4, 2022

(54) ACCESS CONTROL METHOD, TERMINAL, AND ACCESS NETWORK DEVICE

(71) Applicant: HUAWEI TECHNOLOGIES CO., LTD., Shenzhen (CN)

(72) Inventors: Le Yan, Shanghai (CN); Yi Guo, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 37 days.

(21) Appl. No.: 16/579,864

(22) Filed: Sep. 24, 2019

(65) Prior Publication Data

US 2020/0022065 A1 Jan. 16, 2020

Related U.S. Application Data

(63) Continuation of application No. PCT/CN2018/079274, filed on Mar. 16, 2018.

(30) Foreign Application Priority Data

Mar. 24, 2017 (CN) .......................... 201710184402.5

(51) Int. Cl.
*H04W 48/04* (2009.01)
*H04W 4/02* (2018.01)

(52) U.S. Cl.
CPC ........... *H04W 48/04* (2013.01); *H04W 4/027* (2013.01)

(58) Field of Classification Search
None
See application file for complete search history.

(56) References Cited

U.S. PATENT DOCUMENTS 9,661,562 B2 * 5/2017 Zhang .................... H04W 48/12
2012/0238252 A1 * 9/2012 Levitan ................... H04W 4/02
455/414.1

(Continued)

FOREIGN PATENT DOCUMENTS

CN 1703111 A 11/2005
CN 101583169 A 11/2009

(Continued)

OTHER PUBLICATIONS

ZTE: "Identify Mobility States of a UE based on UE History Information", 3GPP TSG RAN WG3 #65bis, R3-092295, Miyazaki, Japan, Oct. 12-15, 2009, total 2 pages. XP050391833.

(Continued)

*Primary Examiner* — Jay P Patel
(74) *Attorney, Agent, or Firm* — Maier & Maier, PLLC

(57) ABSTRACT

Embodiments of this application disclose an access control method, a terminal, and an access network device. The method includes: receiving, by an access network device, indication information; determining, by the access network device, a terminal as a terminal in high-speed movement based on the indication information;
performing, by the access network device, a timing operation; when a time of the timing operation exceeds a preset time threshold, calculating, by the access network device, a moving speed of the terminal; and when the moving speed of the terminal is less than a preset speed threshold, forbidding, by the access network device, the terminal to access a cell of the access network device, where the cell of the access network device is a dedicated cell of a terminal located in a high-speed moving vehicle.

12 Claims, 12 Drawing Sheets

(56) References Cited

U.S. PATENT DOCUMENTS

| | | |
|---|---|---|
| 2012/0289233 A1 | 11/2012 | Medbo et al. |
| 2013/0079018 A1* | 3/2013 | Teyeb .................. H04W 36/32 |
| | | 455/441 |
| 2013/0084884 A1 | 4/2013 | Teyeb et al. |
| 2013/0178213 A1 | 7/2013 | Li |
| 2013/0244654 A1* | 9/2013 | Carmon ............... H04W 36/32 |
| | | 455/436 |
| 2013/0295931 A1* | 11/2013 | Yu ........................ H04W 36/32 |
| | | 455/435.1 |
| 2014/0018082 A1* | 1/2014 | Cheng ............... H04W 36/0005 |
| | | 455/444 |
| 2014/0099962 A1* | 4/2014 | Capdevielle ...... H04W 36/0066 |
| | | 455/441 |
| 2014/0295851 A1* | 10/2014 | Kubota ........... H04W 36/00835 |
| | | 455/441 |
| 2014/0355542 A1* | 12/2014 | Zhang .................. H04W 4/029 |
| | | 370/329 |
| 2015/0045040 A1* | 2/2015 | Lai ....................... H04W 36/30 |
| | | 455/441 |
| 2015/0049681 A1* | 2/2015 | Huang ............... H04W 72/1289 |
| | | 370/329 |
| 2015/0181480 A1 | 6/2015 | Bulakci et al. |
| 2016/0066315 A1* | 3/2016 | Zhang ............... H04W 72/0446 |
| | | 370/329 |
| 2016/0227458 A1* | 8/2016 | Lee ....................... H04W 48/04 |
| 2016/0286442 A1* | 9/2016 | Huang .................. H04W 36/16 |
| 2017/0041916 A1* | 2/2017 | Soret .................... H04W 8/005 |
| 2017/0164265 A1* | 6/2017 | Dai .................... H04W 36/0011 |
| 2017/0201919 A1 | 7/2017 | Chong et al. |
| 2017/0290054 A1* | 10/2017 | Zhao .................... H04W 74/006 |
| 2018/0027419 A1* | 1/2018 | Xu .................... H04W 72/0486 |
| | | 455/454 |
| 2018/0152876 A1* | 5/2018 | Gu ........................ H04W 36/32 |
| 2019/0098570 A1* | 3/2019 | Zhang .................. H04W 28/00 |
| 2019/0191404 A1* | 6/2019 | Tang ..................... H04W 76/14 |
| 2020/0236605 A1* | 7/2020 | Yiu ....................... H04W 36/24 |

FOREIGN PATENT DOCUMENTS

| | | |
|---|---|---|
| CN | 102137424 A | 7/2011 |
| CN | 102938917 A | 2/2013 |
| CN | 103379618 A | 10/2013 |
| CN | 103460758 A | 12/2013 |
| CN | 103945467 A | 7/2014 |
| CN | 104244268 A | 12/2014 |
| CN | 104427515 A | 3/2015 |
| CN | 104918258 A | 9/2015 |
| CN | 105142194 A | 12/2015 |
| CN | 105519153 A | 4/2016 |
| CN | 106454715 A | 2/2017 |
| EP | 2209230 A1 | 7/2010 |
| EP | 2696625 A1 | 2/2014 |
| EP | 2878154 A1 | 6/2015 |
| EP | 3209058 A1 | 8/2017 |
| WO | 2016049814 A1 | 4/2016 |
| WO | 2016095974 A1 | 6/2016 |
| WO | 2016137585 A1 | 9/2016 |
| WO | WO-2017020205 A1 * | 2/2017 ............ H04W 36/32 |

OTHER PUBLICATIONS

3GPP TS 36.413 V14.1.0 (Jan. 2017); 3rd Generation Partnership Project;Technical Specification Group Radio Access Network; Evolved Universal Terrestrial Radio Access Network (E-UTRAN);S1 Application Protocol (S1AP) (Release 14).

3GPP TS 36.423 V14.1.0 (Jan. 2017);3rd Generation Partnership Project; Technical Specification Group Radio Access Network; Evolved Universal Terrestrial Radio Access Network (E-UTRAN); X2 application protocol (X2AP) (Release 14).

\* cited by examiner

ACCESS CONTROL METHOD, TERMINAL, AND ACCESS NETWORK DEVICE

CROSS-REFERENCE TO RELATED APPLICATIONS

This application is a continuation of International Application No. PCT/CN2018/079274, filed on Mar. 16, 2018, which claims priority to Chinese Patent Application No.201710184402.5, filed on Mar. 24, 2017. The disclosures of the aforementioned applications are hereby incorporated by reference in their entireties.

TECHNICAL FIELD

This application relates to the field of communications technologies, and in particular, to an access control method, a terminal, and an access network device.

BACKGROUND

With development of communications technologies, a terminal may access a mobile communications network anytime anywhere to obtain a communication service. However, when a terminal is used in a high-speed moving vehicle such as a high-speed train, a magnetic levitation train, and a metro train, because the terminal fails to perform cell handover and reselection in time in a high-speed moving process, and a penetration loss of an electromagnetic signal is caused because the train is made of steel and iron, a signal received by the terminal is relatively poor, and user experience is affected.

To deliver satisfactory user experience, an operator builds a dedicated network that is along a railway and that is specially for a terminal located in a high-speed moving vehicle, to provide a dedicated cell for a terminal located in a high-speed moving vehicle. Signal quality of the dedicated cell is superior to signal quality of a public network for another terminal. Therefore, better coverage can be provided to compensate for a penetration loss caused by a carriage. However, because a terminal in an idle mode performs cell selection based on signal quality, a large quantity of other terminals near the railway camp on the foregoing dedicated cell.

Once the terminal in an idle mode establishes a radio resource control (RRC) connection on the dedicated network to enter a connected mode and communicates by using the network, the dedicated cell will be congested, and consequently, user experience in the high-speed moving vehicle is reduced.

Therefore, how to prevent a terminal in a non-high-speed moving vehicle from maintaining or establishing a radio resource control connection to a dedicated cell of a terminal in a high-speed moving vehicle becomes an urgent problem to be resolved.

SUMMARY

Embodiments of this application provide an access control method, a terminal, and an access network device, so that congestion of the dedicated cell that is caused when a terminal in a non-high-speed moving vehicle maintains or establishes a radio resource control connection to a dedicated cell of a terminal in a high-speed moving vehicle can be avoided.

According to a first aspect, an embodiment of this application provides an access control method, including:

receiving, by an access network device, indication information;

performing, by the access network device after determining a terminal as a terminal in high-speed movement based on the indication information, a timing operation;

when a time of the timing operation exceeds a preset time threshold, calculating, by the access network device, a moving speed of the terminal; and when the moving speed of the terminal is less than a preset speed threshold, forbidding, by the access network device, the terminal to access a cell of the access network device, where the cell of the access network device is a dedicated cell of a terminal located in a high-speed moving vehicle.

In this implementation, the preset time threshold may be set based on a station dwell time of a train. Therefore, the following problem can be avoided: The terminal located in the high-speed moving vehicle (when the high-speed moving vehicle stops at a station) is determined as a terminal in non-high-speed movement and consequently is forbidden to access the dedicated cell.

In an optional implementation, the forbidding, by the access network device, the terminal to access a cell of the access network device includes:

forbidding, by the access network device, the terminal to be handed over to the cell of the access network device; or disconnecting, by the access network device, the terminal from the cell of the access network device.

In this implementation, when the moving speed of the terminal is less than the preset speed threshold, if the terminal maintains a radio resource control connection to the cell of the access network device, the terminal is disconnected from the cell of the access network device; or if the terminal does not access the cell of the access network device, the terminal is forbidden to be handed over to the cell of the access network device.

In an optional implementation, after the calculating, by the access network device, a moving speed of the terminal, the method further includes:

when the moving speed of the terminal is greater than or equal to the preset speed threshold, allowing, by the access network device, the terminal to access the cell of the access network device; or when the moving speed of the terminal is greater than or equal to the preset speed threshold, maintaining, by the access network device, the connection between the terminal and the cell of the access network device.

In this implementation, when the moving speed of the terminal is greater than the preset speed threshold, if the terminal maintains a radio resource control connection to the cell of the access network device, the connection between the terminal and the cell of the access network device is maintained; or if the terminal does not access the cell of the access network device, the terminal is allowed to access the cell of the access network device.

In an optional implementation, the indication information includes an identifier indicating that the terminal is a terminal in high-speed movement; and the determining, by the access network device, a terminal as a terminal in high-speed movement based on the indication information includes:

obtaining, by the access network device, the identifier in the indication information to determine the terminal as a terminal in high-speed movement.

In this implementation, the access network device may receive indication information sent by a source access network device. Because the source access network device determines whether the terminal is a terminal in high-speed movement, the indication information can directly carry an identifier used to indicate that the terminal is a terminal in high-speed movement.

In an optional implementation, the indication information includes identifiers of at least two historical cells, types of the at least two historical cells, and time of maintaining radio resource control connections to the at least two historical cells; and when the access network device receives the indication information, the historical cell is a second cell to which the terminal is maintaining a radio resource control connection or a first cell to which the terminal maintains a radio resource control connection before maintaining the radio resource control connection to the second cell; and the determining, by the access network device, a terminal as a terminal in high-speed movement based on the indication information includes:

calculating, by the access network device, the moving speed of the terminal based on the identifiers of the at least two historical cells, the types of the at least two historical cells, and the time of maintaining the radio resource control connections to the at least two historical cells, and determining the terminal as a terminal in high-speed movement based on the moving speed.

In this implementation, the access network device may receive indication information sent by a source access network device, calculate the moving speed of the terminal based on the identifier and the type of the historical cell accessed by the terminal and the time of maintaining the radio resource control connection, which are provided in the indication information, so as to determine whether the terminal is a terminal in high-speed movement, where the source access network device is an access network device to which a current terminal maintains a radio resource control connection.

In an optional implementation, the indication information includes attributes of at least two historical cells, the attribute of the historical cell is used to indicate whether the historical cell is a dedicated cell of a terminal located in a high-speed moving vehicle, and when the access network device receives the indication information, the historical cell is a second cell to which the terminal is maintaining a radio resource control connection or a first cell to which the terminal maintains a radio resource control connection before maintaining the radio resource control connection to the second cell; and the determining, by the access network device, a terminal as a terminal in high-speed movement based on the indication information includes:

determining, by the access network device, the terminal as a terminal in high-speed movement based on the attribute of the historical cell.

In this implementation, the access network device may receive indication information sent by a source access network device, and determine, based on the attribute that is provided in the indication information and that is of the historical cell accessed by the terminal, whether the terminal is a terminal in high-speed movement.

According to a second aspect, an embodiment of this application provides an access control method, including:

sending, by a first access network device, indication information to a second access network device, where the indication information includes an identifier indicating that a terminal is a terminal in high-speed movement; or the indication information includes identifiers of at least two historical cells, types of the at least two historical cells, and time of maintaining radio resource control connections to the at least two historical cells, and when the first access network device receives the indication information, the historical cell is a second cell to which the terminal is maintaining a radio resource control connection or a first cell to which the terminal maintains a radio resource control connection before maintaining the radio resource control connection to the second cell; or the indication information includes attributes of the at least two historical cells, and the attribute of the historical cell is used to indicate whether the historical cell is a dedicated cell of a terminal located in a high-speed moving vehicle;

receiving, by the first access network device, an answer message fed back by the second access network device based on the indication information; and determining, by the first access network device based on the answer message, whether to send a handover message to the terminal, where the handover message is used to hand over the terminal from a cell of the first access network device to a cell of the second access network device.

In this implementation, the indication information sent by the first access network device to the second access network device includes information used to determine whether the terminal is a terminal in high-speed movement, and the second access network device can determine, based on the indication information, whether the terminal is a terminal in high-speed movement, so as to determine whether the terminal is allowed to access a dedicated cell of a terminal that is of the second access network device and that is located in a high-speed moving vehicle.

According to a third aspect, an embodiment of this application provides an access control method, including:

receiving, by a terminal, indication information sent by an access network device to which a first cell belongs, where the first cell is a dedicated cell of a terminal located in a high-speed moving vehicle;

determining, by the terminal based on the indication information, whether the terminal is a terminal in high-speed movement; and when the terminal is not a terminal in high-speed movement, selecting, by the terminal, a second cell for camping, where the second cell is a common cell other than the dedicated cell.

In this implementation, when the terminal performs cell reselection, there are a first cell and a second cell for selection, where the first cell is the dedicated cell of the terminal located in the high-speed moving vehicle, and the second cell is the common cell other than the foregoing dedicated cell. To avoid a terminal that is not in a high-speed moving state from camping on the dedicated cell, the terminal receives indication information sent by the first cell, and determines, based on the indication information, whether the terminal is a terminal in high-speed movement. If the terminal is a terminal in high-speed movement, the terminal accesses the dedicated cell; or if the terminal is not a terminal in high-speed movement, the terminal accesses the common cell.

In an optional implementation, the indication information includes an identifier indicating whether the first cell belongs to a preset area; and the determining, by the terminal based on the indication information, whether the terminal is a terminal in high-speed movement includes:

when the indication information indicates that the first cell belongs to the preset area, and the terminal is a terminal in high-speed movement before receiving the indication information, determining the terminal as a terminal in high-speed movement; or when the indication information indicates that the first cell does not belong to the preset area, calculating a moving speed of the terminal, and determining, based on a result of the calculation, whether the terminal is a terminal in high-speed movement.

In this implementation, the foregoing preset area may be set to an area near a train platform. If the indication information that is received by the terminal and that is sent by the first cell indicates that the first cell belongs to the area near the platform, the terminal does not perform calculation of the moving speed on the terminal, but directly determines, based on a moving state before the indication information is received, whether the terminal is currently a terminal in high-speed movement. In this manner, the following problem is avoided: A terminal located in a high-speed moving vehicle (when the high-speed moving vehicle stops at a station) determines that the terminal is a terminal in non-high-speed movement and consequently does not select the foregoing dedicated cell for camping.

In an optional implementation, the indication information includes an identifier indicating whether the terminal performs speed calculation; and the determining, by the terminal based on the indication information, whether the terminal is a terminal in high-speed movement includes:

when the indication information is used to instruct the terminal not to perform the speed calculation, and the terminal is a terminal in high-speed movement before receiving the indication information, determining the terminal as a terminal in high-speed movement; or when the indication information is used to instruct the terminal to perform the speed calculation, calculating a speed of the terminal, and determining, based on a result of the speed calculation, whether the terminal is a terminal in high-speed movement.

In this implementation, if the first cell belongs to the area near the platform, the indication information sent to the terminal by the access network device to which the first cell belongs may indicate that the terminal does not perform the speed calculation. Therefore, the following problem is avoided: A terminal located in a high-speed moving vehicle (when the high-speed moving vehicle stops at a station) determines that the terminal is a terminal in non-high-speed movement and consequently does not select the foregoing dedicated cell for camping.

In an optional implementation, the indication information includes first weight information, and the first weight information is a weight that is of the speed calculation performed by the terminal after the terminal receives the indication information and that is in a weighted speed calculation result; and the determining, by the terminal based on the indication information, whether the terminal is a terminal in high-speed movement includes:

obtaining a target result of the speed calculation performed by the terminal after the terminal receives the indication information and historical results of at least two times of historical speed calculation, where the historical speed calculation is speed calculation recently performed by the terminal; and performing weighting calculation on the target result and the historical results based on the first weight information to obtain the weighted speed calculation result, and determining, based on the weighted speed calculation result, whether the terminal is a terminal in high-speed movement.

In this implementation, a weight that is of speed calculation performed on a cell belonging to the area near the platform and that is in a final speed calculation result can be reduced. Therefore, the following problem is avoided: A terminal located in a high-speed moving vehicle (when the high-speed moving vehicle stops at a station) determines that the terminal is a terminal in non-high-speed movement and consequently does not select the foregoing dedicated cell for camping.

In an optional implementation, the indication information includes an identifier indicating that the terminal performs the speed calculation through weighting calculation; and the determining, by the terminal based on the indication information, whether the terminal is a terminal in high-speed movement includes:

obtaining a first result of the speed calculation performed by the terminal after the terminal receives the indication information and a second result of the historical speed calculation, where the historical speed calculation is speed calculation recently performed by the terminal; and performing the weighting calculation on the first result and the second result based on second weight information preset in the terminal, to obtain a weighted speed calculation result, and determining, based on the weighted speed calculation result, whether the terminal is a terminal in high-speed movement.

In this implementation, a weight that is of speed calculation performed on a cell belonging to the area near the platform and that is in a final speed calculation result can be reduced. Therefore, the following problem is avoided: A terminal located in a high-speed moving vehicle (when the high-speed moving vehicle stops at a station) determines that the terminal is a terminal in non-high-speed movement and consequently does not select the foregoing dedicated cell for camping.

In an optional implementation, the indication information includes a first time threshold for indicating that the terminal delays performing the speed calculation; and the determining, by the terminal based on the indication information, whether the terminal is a terminal in high-speed movement includes:

when a time passed after the indication information is received exceeds the first time threshold, calculating a speed of the terminal to determine whether the terminal is a terminal in high-speed movement.

In this implementation, if the first cell belongs to the area near the platform, the access network device to which the first cell belongs can set the first time threshold based on a station dwell time of a train. Therefore, the terminal does not calculate the speed of the terminal in a time during which the train stops at a station, and the following problem is avoided: A terminal located in a high-speed moving vehicle (when the high-speed moving vehicle stops at a station) determines that the terminal is a terminal in non-high-speed movement and consequently does not select the foregoing dedicated cell for camping.

In an optional implementation, the indication information includes an identifier indicating that the terminal delays the speed calculation; and the determining, by the terminal based on the indication information, whether the terminal is a terminal in high-speed movement includes:

when the time passed after the indication information is received exceeds a preset second time threshold, calculating a speed of the terminal to determine whether the terminal is a terminal in high-speed movement.

In this implementation, if the first cell belongs to the area near the platform, the second time threshold can be set based on a station dwell time of the train. Therefore, the terminal does not calculate the speed of the terminal in a time during which the train stops at a station, and the following problem is avoided: A terminal located in a high-speed moving vehicle (when the high-speed moving vehicle stops at a station) determines that the terminal is a terminal in non-high-speed movement and consequently does not select the foregoing dedicated cell for camping.

According to a fourth aspect, an embodiment of this application provides an access control method, including:

sending, by an access network device, indication information to a terminal, where a cell of the access network device is a dedicated cell of a terminal located in a high-speed moving vehicle; and the indication information includes an identifier indicating whether the terminal performs speed calculation; or the indication information includes first weight information, and the first weight information is a weight that is of speed calculation performed by the terminal after the terminal receives the indication information and that is in a weighted speed calculation result; or the indication information includes an identifier indicating that the terminal performs speed calculation through weighting calculation; or the indication information includes a first time threshold for indicating that the terminal delays performing speed calculation; or the indication information includes an identifier indicating that the terminal delays speed calculation.

In this implementation, if the cell of the access network device belongs to an area near a platform, the access network device can send the indication information to the terminal. The indication information carries a plurality of types of the foregoing information. Therefore, a terminal device performs a specific adjustment when calculating a speed of the terminal device, and the following problem is avoided: A terminal located in a high-speed moving vehicle (when the high-speed moving vehicle stops at a station) determines that the terminal is a terminal in non-high-speed movement and consequently does not select the foregoing dedicated cell for camping.

According to a fifth aspect, an embodiment of this application provides an access network device, including:

a receiving unit, configured to receive indication information;

a determining unit, configured to determine, based on the indication information received by the receiving unit, a terminal as a terminal in high-speed movement;

a timing unit, configured to: after the determining unit determines the terminal as a terminal in high-speed movement, perform a timing operation;

a calculation unit, configured to: when a time of the timing operation of the timing unit exceeds a preset time threshold, calculate a moving speed of the terminal; and a control unit, configured to: when the moving speed of the terminal that is obtained by the calculation unit through calculation is less than a preset speed threshold, forbid the terminal to access a cell of the access network device, where the cell of the access network device is a dedicated cell of a terminal located in a high-speed moving vehicle.

According to a sixth aspect, an embodiment of this application provides a first access network device, including:

a sending unit, configured to send indication information to a second access network device, where the indication information includes an identifier indicating that a terminal is a terminal in high-speed movement; or the indication information includes identifiers of at least two historical cells, types of the at least two historical cells, and time of maintaining radio resource control connections to the at least two historical cells, and when the first access network device receives the indication information, the historical cell is a second cell to which the terminal is maintaining a radio resource control connection or a first cell to which the terminal maintains a radio resource control connection before maintaining the radio resource control connection to the second cell; or the indication information includes attributes of the at least two historical cells, and the attribute of the historical cell is used to indicate whether the historical cell is a dedicated cell of a terminal located in a high-speed moving vehicle;

a receiving unit, configured to receive an answer message fed back by the target access network device based on the indication information; and a determining unit, configured to determine, based on the answer message received by the receiving unit, whether to send a handover message to the terminal, where the handover message is used to hand over the terminal from a cell of the first access network device to a cell of the second access network device.

According to a seventh aspect, an embodiment of this application provides a terminal, including:

a receiving unit, configured to receive indication information sent by an access network device to which a first cell belongs, where the first cell is a dedicated cell of a terminal located in a high-speed moving vehicle;

a determining unit, configured to determine, based on the indication information received by the receiving unit, whether the terminal is a terminal in high-speed movement; and a selection unit, configured to: when the determining unit determines that the terminal is not a terminal in high-speed movement, select a second cell for camping, where the second cell is a common cell other than the dedicated cell.

According to an eighth aspect, an embodiment of this application provides an access network device, including:

a sending unit, configured to send indication information to a terminal, where a cell of the access network device is a dedicated cell of a terminal located in a high-speed moving vehicle; and the indication information includes an identifier indicating whether the terminal performs speed calculation; or the indication information includes first weight information, and the first weight information is a weight that is of speed calculation performed by the terminal after the terminal receives the indication information and that is in a weighted speed calculation result; or the indication information includes an identifier indicating that the terminal performs speed calculation through weighting calculation; or the indication information includes a first time threshold for indicating that the terminal delays performing speed calculation; or the indication information includes an identifier indicating that the terminal delays speed calculation.

According to a ninth aspect, an embodiment of this application provides an access control method, including:

obtaining, by a terminal from a high-speed moving vehicle, an identification identifier indicating that the terminal is located in the high-speed moving vehicle;

sending, to an access network device, authentication information generated based on the identification identifier, to access a cell of the access network device, where the cell of the access network device is a dedicated cell of a terminal located in a high-speed moving tool; and selecting, based on the identification identifier, to camp on the cell of the access network device.

In this implementation, the terminal generates the authentication information by using the identification identifier obtained from the high-speed moving vehicle, to prove, to the access network device, that the terminal is a terminal located in a high-speed moving vehicle, so as to access a dedicated cell of a terminal that is of the access network device and that is located in a high-speed movement vehicle.

In an optional implementation, the obtaining, by a terminal from a high-speed moving vehicle, an identification identifier indicating that the terminal is located in the high-speed moving vehicle includes:

identifying two-dimensional code information of the high-speed moving vehicle in which the terminal is located, to obtain the identification identifier; or receiving the identification identifier sent by a device located in the high-speed moving vehicle.

In this implementation, the foregoing identification identifier can be provided in a form of a two-dimensional code. Alternatively, an identification device is disposed on the high-speed moving vehicle to broadcast the identification identifier in a specific coverage area.

According to a tenth aspect, an embodiment of this application provides an access control method, including:

obtaining, by an access network device, an access request message of a terminal;

determining, based on the access request message, the terminal as a terminal located in a high-speed moving vehicle, and allowing the terminal to access a cell of the access network device, where the cell of the access network device is a dedicated cell of a terminal located in a high-speed moving vehicle.

In this implementation, the access network device determines, based on user information that is carried in the access request message and that is corresponding to the terminal, the terminal as a terminal located in a high-speed moving vehicle after performing specific query verification. Therefore, the terminal is allowed to access the cell of the access network device.

In an optional implementation, the determining, based on the access request message, the terminal as a terminal located in a high-speed moving vehicle includes:

obtaining, based on the access request message, user registration information of the terminal from a home subscriber server HSS of the terminal; and querying, based on the user registration information, in a database corresponding to the high-speed moving vehicle, whether an entry of a user corresponding to the terminal exists; and when the entry of the user corresponding to the terminal exists in the database, determining the terminal as the terminal located in the high-speed moving vehicle.

In this implementation, in the database of the foregoing high-speed moving vehicle, the entry of the user corresponding to the terminal can be ticket buying information of the user; and it can be determined, based on the ticket buying information of the user, that the terminal is located in the high-speed moving vehicle in a train taking time corresponding to the ticket buying information.

In an optional implementation, before the obtaining, by an access network device, an access request message of a terminal, the method further includes:

sending, by the access network device to the terminal, a prompt message that includes an equivalent public land mobile network PLMN, where the equivalent PLMN is used to identify the cell of the access network device as the dedicated cell of the terminal located in the high-speed moving vehicle.

In this implementation, the access network device can broadcast the foregoing prompt message, to inform a terminal in a coverage area of the access network device that the access network device allows the terminal to access a cell of a base station; and the cell of the access network device is the dedicated cell of the terminal located in the high-speed moving vehicle.

In an optional implementation, the access network device provided in this application may include a corresponding unit that is configured to perform a behavior of the access network device in the foregoing method design. The unit may be software and/or hardware. Optionally, a structure of the access network device provided in this application includes a processor and a transceiver. The processor is configured to support the access network device in performing a corresponding function in the foregoing method. The transceiver is configured to: support communication between the access network device and the terminal, and send, to the terminal, information or a message in the foregoing method. The access network device may further include a memory. The memory is configured to be coupled to the processor, and the memory stores a program message and data that are necessary for the access network device. The access network device may further include a communications interface. The communications interface is configured to communicate with another network device.

In an optional implementation, the terminal provided in this application may include a corresponding unit that is configured to perform a behavior of the terminal in the foregoing method design. The unit may be software and/or hardware. Optionally, a structure of the terminal provided in this application includes a processor and a transceiver. The processor is configured to support the terminal in performing a corresponding function in the foregoing method. The transceiver is configured to: support communication between the access network device and the terminal, and send, to the access network device, information or a message in the foregoing method. The terminal may further include a memory. The memory is configured to be coupled to the processor, and the memory stores a program message and data that are necessary for the terminal.

According to an eleventh aspect, an embodiment of this application provides a computer program product including a message. When the computer program product runs on a computer, the computer performs the methods in the foregoing aspects.

According to a twelfth aspect, an embodiment of this application provides a computer readable storage medium. The computer readable storage medium stores a message. When the computer readable storage medium runs on a computer, the computer performs the methods in the foregoing aspects.

By implementing the embodiments of this application, after determining a terminal as a terminal in high-speed movement based on indication information, an access network device performs a timing operation; if a time of the timing operation exceeds a preset time threshold, calculates a current moving speed of the terminal; or if a moving speed of the terminal is less than a preset speed threshold, forbids the terminal to access a dedicated cell that is of the access network device and that is located in a high-speed moving vehicle. Therefore, a terminal located in a high-speed moving vehicle (when the high-speed moving vehicle stops at a station) and a terminal in non-high-speed movement are effectively identified, and congestion of the dedicated cell that is caused when a terminal in a non-high-speed moving vehicle camps on the foregoing dedicated cell is avoided.

DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

Figure 1A:
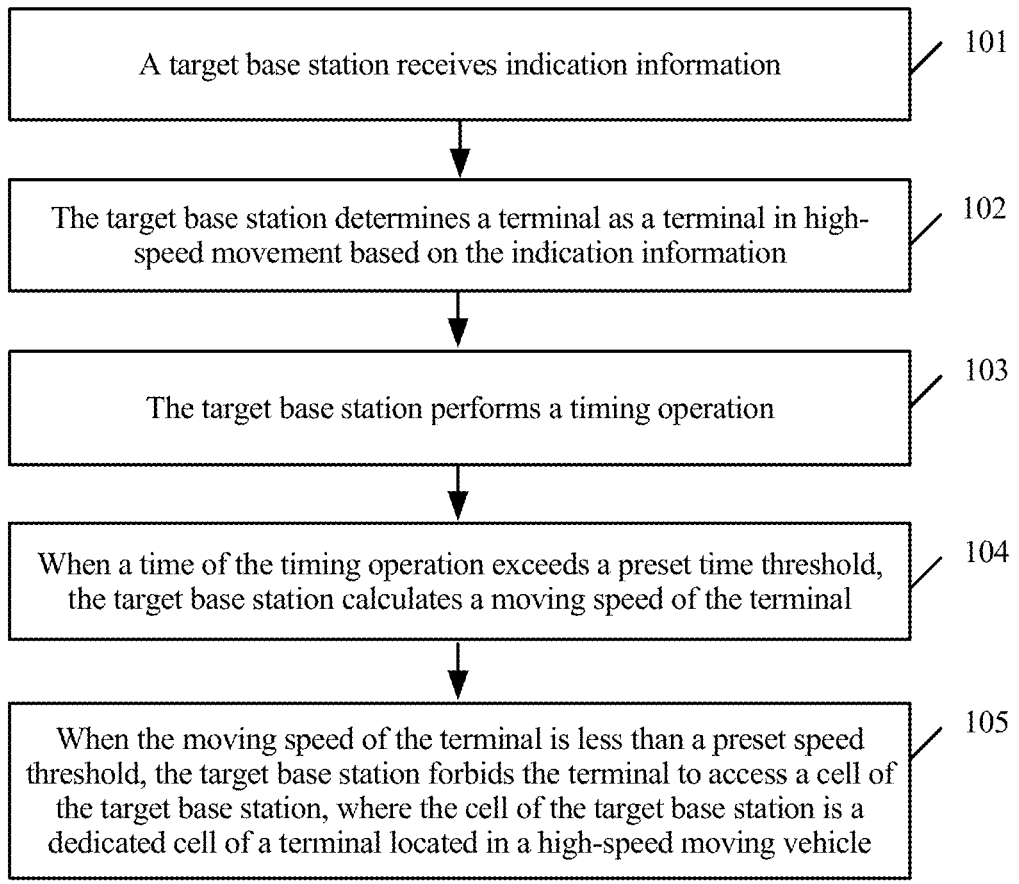
FIG. 1A is a schematic flowchart of an access control method according to an embodiment of this application.

The following describes the embodiments of this application with reference to the accompanying drawings in the embodiments of this application.

Embodiments of this application provide an access control method, a terminal, and a base station, so that a terminal located in a high-speed moving vehicle (when the high-speed moving vehicle stops at a station) and a terminal in non-high-speed movement can be effectively identified, to avoid congestion of the dedicated cell that is caused when the terminal in non-high-speed movement maintains or establishes a radio resource control connection to a dedicated cell of a terminal in a high-speed moving vehicle.

The dedicated cell of the terminal located in the high-speed moving vehicle in the embodiments of this application refers to a dedicated cell of a private network through which an operator provides a communication service for a user taking a high-speed moving vehicle. The foregoing private network includes but is not limited to a fifth generation mobile communications technology (5th-Generation, 5G) system, a long term evolution (Long Term Evolution, LTE) network, a global system for mobile communications (Global System of Mobile communication, GSM), or a universal mobile telecommunications system (Universal Mobile Telecommunications System, UMTS) network. The 5G system may be a new radio (New Radio, NR) system.

The following describes an example in which an access network device is a base station. However, this application is not limited thereto. The access network device described in the embodiments of this application includes a base station device in an NR system, for example, a gNB, a transmission point (transmission point, TRP), or a base station device including a central unit (central unit, CU) and a distributed unit (distributed unit, DU). The CU may also be referred to as a control unit (control unit). When a base station device in a long term evolution (long term evolution, LTE) system, namely, an evolved NodeB (evolved nodeB, eNB), can be connected to a 5G core network (5G-Core, 5G CN), the LTE eNB may also be referred to as an eLTE eNB. Specifically, the eLTE eNB is an LTE base station device evolved based on the LTE eNB. Alternatively, the access network device may be an access point (access point, AP), or another network device capable of communicating with a terminal and a core network. A type of the access network device is not specially limited in the embodiments of this application. In addition, a base station device in a GSM is a base transceiver station (BTS, Base Transceiver Station) or a base station controller (Base Station Controller, BSC); and a base station device in a UMTS is a nodeB (Node B) or a radio network controller (Radio Network Controller, RNC).

The terminal in the embodiments of this application may include a handheld device, an in-vehicle device, a wearable device, or a computing device that has a wireless communication function, another processing device connected to a wireless modem, or user equipment (user equipment, UE), a mobile station (mobile station, MS), a terminal device (terminal equipment), or the like that is in various forms.

The following description is based on an example in which a high-speed moving vehicle is a high-speed train and a dedicated cell of a terminal located in a high-speed moving vehicle is a high-speed train LTE dedicated cell (high-speed train dedicated cell for short). However, this application is not limited thereto, and the high-speed moving vehicle includes but is not limited to a moving vehicle whose moving speed may reach or exceed a corresponding threshold, such as a high-speed train, a magnetic levitation train, a metro train, and a vehicle on a highway.

FIG. 1A is a schematic flowchart of an access control method according to an embodiment of this application. The procedure includes the following steps:

101. A target base station receives indication information.

The embodiment of this application may be applied to an application scenario in which a terminal in a connected mode is handed over from a source base station to a target base station.

The foregoing connected mode refers to a radio resource control (Radio Resource Control, RRC) state of a terminal on an air interface. A terminal has two radio resource control states on an air interface: an idle mode (IDLE) and a connected mode (Connected). When needing to perform a service, a terminal needs to establish a connection to a network, to be specific, switch from the idle mode to the connected mode, and then transmits service data. A terminal in the idle mode camps on a cell, and because of mobility of a terminal, performs cell reselection to change a cell on which the terminal is to camp. When downlink data arrives or uplink data arrives at the terminal in the idle mode, the terminal initiates a new RRC connection establishment on a cell on which the terminal currently camps to enter the connected mode. If a terminal in the connected mode has not transmitted data for a long time, a base station sends an RRC connection release message to the terminal. Therefore, the terminal enters the idle mode.

In the embodiment of this application, the indication information in step 101 may be included in a dedicated message that can be used by the target base station to determine whether a terminal is a terminal in high-speed movement, or may be included in another message. For example, the indication information may be carried in a handover request message that is sent by the source base station to the target base station and that is used to request a cell of the target base station to allow the terminal to access the cell.

Optionally, when a base station includes a CU and a DU, to be specific, a function of the base station is implemented by the CU and the DU, the target base station receives the indication information from the source base station by using the CU. In addition, when the target base station or the source base station receives information of the terminal or sends information to the terminal, the terminal directly communicates with the DU, and the DU sends the received information of the terminal to the CU for processing; or the DU transmits a message delivered by the CU to the terminal.

102. The target base station determines the terminal as a terminal in high-speed movement based on the indication information.

In the embodiment of this application, the target base station may parse the received indication information, and determine, based on content of the indication information, whether the terminal is a terminal in high-speed movement.

In an optional implementation, the foregoing indication information may include an identifier indicating that the terminal is a terminal in high-speed movement. The identifier may be a binary bit value. For example, "0" indicates that the terminal is a low-speed terminal, and "1" indicates that the terminal is a high-speed terminal. The identifier may alternatively be a Boolean value: "FALSE" indicates that the terminal is a low-speed terminal, and "TRUE" indicates that the terminal is a high-speed terminal. The identifier may alternatively be a specific information element: When carrying the information element, the indication information indicates that the terminal is a high-speed terminal; or when not carrying the information element, the indication information indicates that the terminal is a low-speed terminal. After parsing the indication information, the target base station obtains the foregoing identifier, to determine whether the terminal is a terminal in high-speed movement.

In an optional implementation, the foregoing indication information may include an identifier and a type of a historical cell to which the terminal is handed over and a time of maintaining a radio resource control connection in a maximum of N handover operations recently performed by the terminal (for example, 15 handover operations recently performed). For example, if the terminal recently performs two handover operations, and maintains radio resource control connections to a cell A and a cell B respectively after completing the two handover operations, the cell A and the cell B are the foregoing historical cells.

The target base station calculates a moving speed of the terminal based on the identifier and the type of the foregoing cell and the time of maintaining the radio resource control connection, and determines, based on the moving speed of the terminal, whether the terminal is a terminal in high-speed movement. The foregoing type may be distinguished based on a coverage area of the cell. For example, if the type of the cell is a micro cell, and a coverage radius of the cell may be between 30 m and 300 m, a moving speed of the terminal when the terminal maintains the radio resource control connection to the cell may be obtained through calculation based on the type of the cell and the time of maintaining the radio resource control connection to the cell.

In an optional implementation, the indication information includes an attribute of a cell to which the terminal is handed over in a maximum of N handover operations recently performed by the terminal, and the attribute of the foregoing cell is used to indicate whether the cell is a high-speed train dedicated cell. The target base station may infer, based on the attribute of the foregoing cell, that the terminal is located in a high-speed train, so as to determine the terminal as a terminal in high-speed movement.

103. The target base station performs a timing operation.

104. When a time of the timing operation exceeds a preset time threshold, the target base station calculates the moving speed of the terminal.

In the embodiment of this application, the target base station performs the timing operation after determining the terminal as a terminal in high-speed movement, and calculates the moving speed of the terminal when the time of the timing operation exceeds the preset time threshold, so as to determine whether the terminal is still a terminal in high-speed movement after duration of the preset time threshold elapses.

In the foregoing implementation, if the target base station is a base station near a high-speed train platform, the foregoing preset time threshold may be set to high-speed train station dwell time. Therefore, when the terminal is a terminal in the high-speed train, if the high-speed train stops at the platform, the target base station may wait until a high-speed train station dwell time passes, and then calculate the moving speed of the terminal, to avoid the following problem: The terminal is determined as a terminal in non-high-speed movement and consequently the terminal is disconnected from the high-speed train dedicated cell or forbidden to access the high-speed train dedicated cell. It should be noted that the foregoing time threshold may not be limited to the high-speed train station dwell time, and may be correspondingly adjusted based on a specific situation.

105. When the moving speed of the terminal is less than a preset speed threshold, the target base station forbids the terminal to access the cell of the target base station, where the cell of the target base station is a dedicated cell of a terminal located in a high-speed moving vehicle.

Figure 1B:
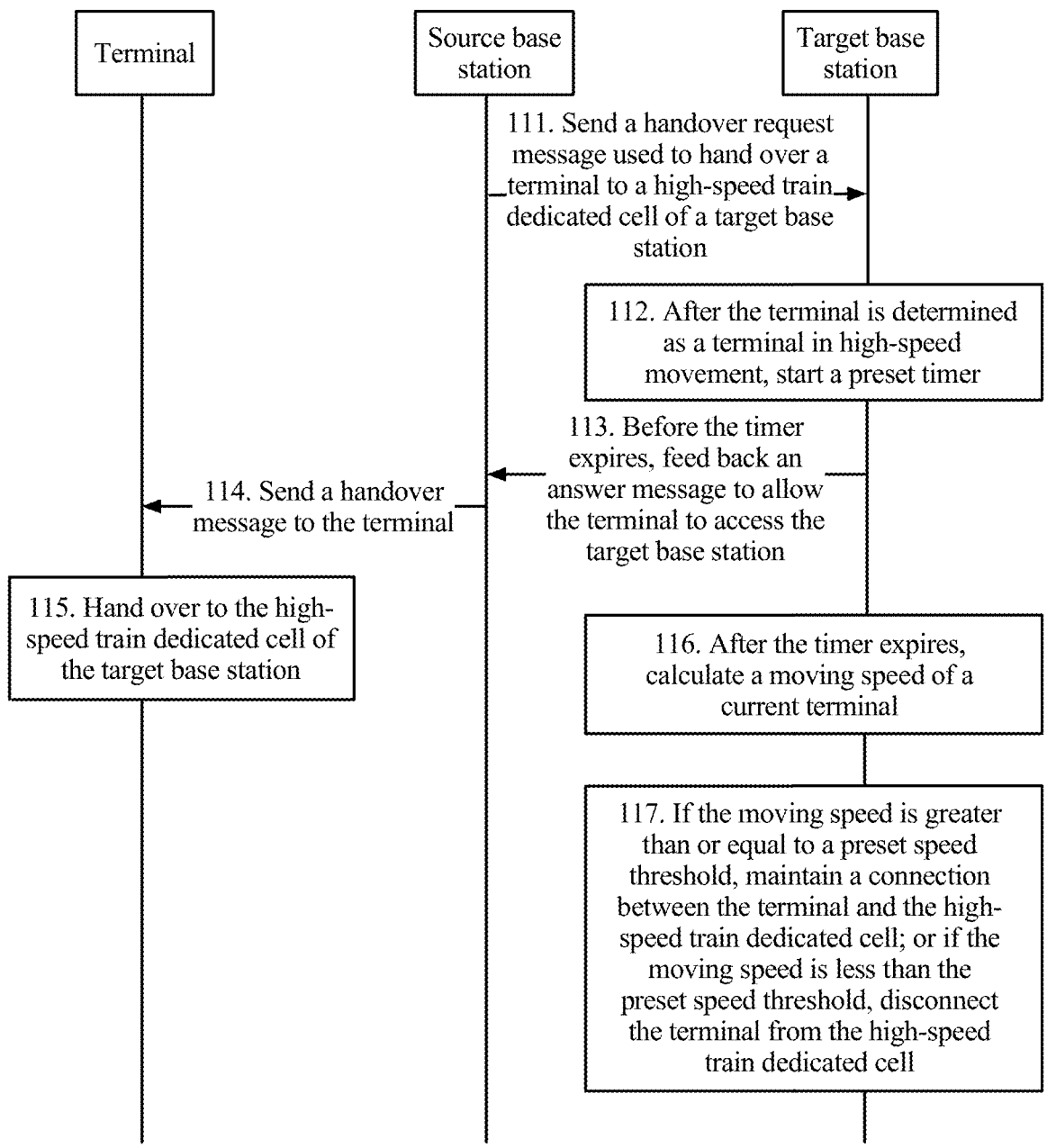
FIG. 1B is a schematic diagram of interaction between a terminal, a source base station, and a target base station according to an embodiment of this application.

FIG. 1B is a schematic diagram of interaction between a terminal, a source base station, and a target base station according to an embodiment of the present invention.

111. The source base station sends, to the target base station, a handover request message that is used to hand over the terminal to a high-speed train dedicated cell of the target base station, where the handover request message carries indication information (for detailed content of the indication information, refer to related description in step 102), to determine whether the terminal is a terminal in high-speed movement.

112. After determining the terminal as a terminal in high-speed movement, the target base station starts a preset timer.

113. The target base station feeds back, to the source base station before the timer expires, an answer message corresponding to the handover request message, to allow the terminal to access the target base station.

114. After receiving the answer message, the source base station sends a handover message to the terminal.

115. After receiving the handover message, the terminal is handed over to the high-speed train dedicated cell of the target base station.

116. After the timer expires, the target base station calculates a moving speed of a current terminal.

117. If the moving speed of the current terminal is greater than or equal to the preset speed threshold, the target base station maintains a connection between the terminal and the high-speed train dedicated cell of this base station; or if the moving speed of the current terminal is less than the preset speed threshold, the target base station disconnects the terminal from the high-speed train dedicated cell of this base station.

Figure 1C:
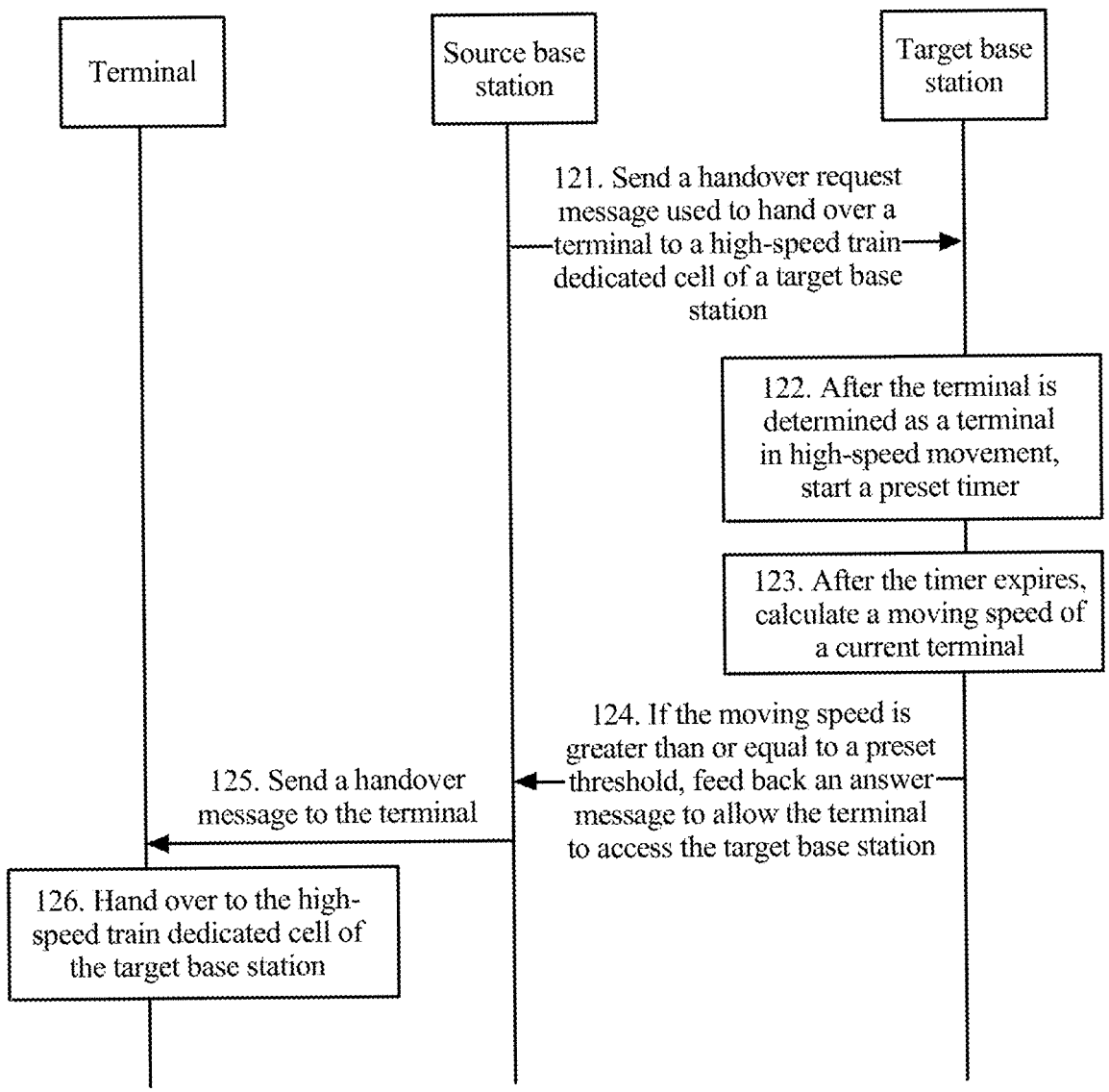
FIG. 1C is another schematic diagram of interaction between a terminal, a source base station, and a target base station according to an embodiment of this application.

FIG. 1C is a schematic diagram of interaction between a terminal, a source base station, and a target base station according to an embodiment of this application.

121. The source base station sends, to the target base station, a handover request message that is used to hand over the terminal to a high-speed train dedicated cell of the target base station, where the handover request message carries indication information (for detailed content of the indication information, refer to related description in step 102), to determine whether the terminal is a terminal in high-speed movement.

122. After determining the terminal as a terminal in high-speed movement, the target base station starts a preset timer.

123. After the timer expires, the target base station calculates a moving speed of the terminal at a current movement.

124. If the moving speed of a current terminal is greater than or equal to a preset speed threshold, the target base station feeds back, to the source base station, an answer message corresponding to the handover request message, to allow the terminal to access the target base station.

125. After receiving the answer message, the source base station sends a handover message to the terminal.

126. After receiving the handover message, the terminal is handed over to the high-speed train dedicated cell of the target base station.

Figure 1D:
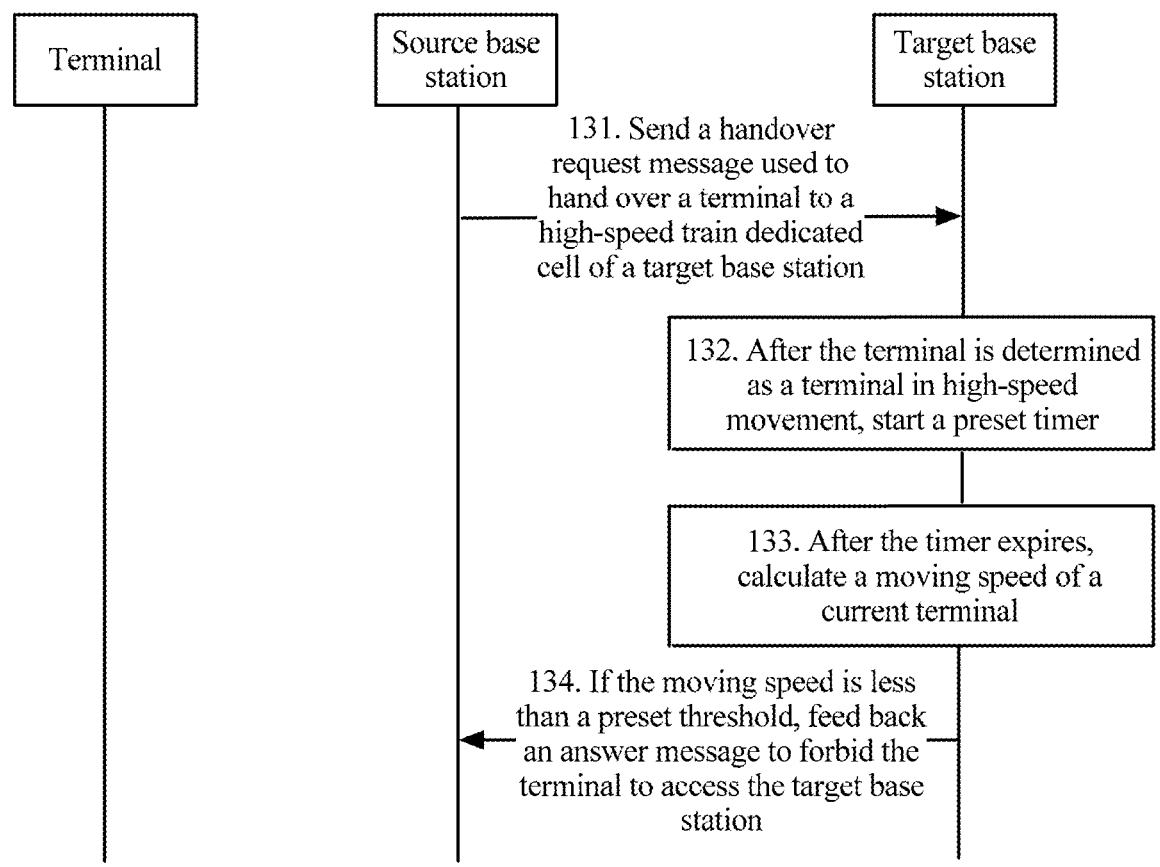
FIG. 1D is still another schematic diagram of interaction between a terminal, a source base station, and a target base station according to an embodiment of this application.

FIG. 1D is a schematic diagram of interaction between a terminal, a source base station, and a target base station according to an embodiment of this application.

131. The source base station sends, to the target base station, a handover request message that is used to hand over the terminal to a high-speed train dedicated cell of the target base station, where the handover request message carries indication information (for detailed content of the indication information, refer to related description in step 102), to determine whether the terminal is a terminal in high-speed movement.

132. After determining the terminal as a terminal in high-speed movement, the target base station starts a preset timer.

133. After the timer expires, the target base station calculates a moving speed of the terminal at a current movement.

134. If the moving speed of a current terminal is less than a preset speed threshold, the target base station feeds back, to the source base station, an answer message corresponding to the handover request message, to forbid the terminal to access the target base station; and after receiving the answer message, the source base station does not perform an operation of sending a handover message to the terminal.

It can be learned that, by implementing the method described in FIG. 1A, a terminal located in a high-speed moving vehicle, including a terminal that is still located in a high-speed moving vehicle when the high-speed moving vehicle stops at a station and a terminal in non-high-speed movement, can be effectively identified, to avoid congestion of the dedicated cell that is caused when the terminal in non-high-speed movement accesses the foregoing dedicated cell, and avoid the following problem: The terminal located in the high-speed moving vehicle is determined as a terminal in non-high-speed movement and consequently is disconnected from or forbidden to access the dedicated cell.

Figure 2:
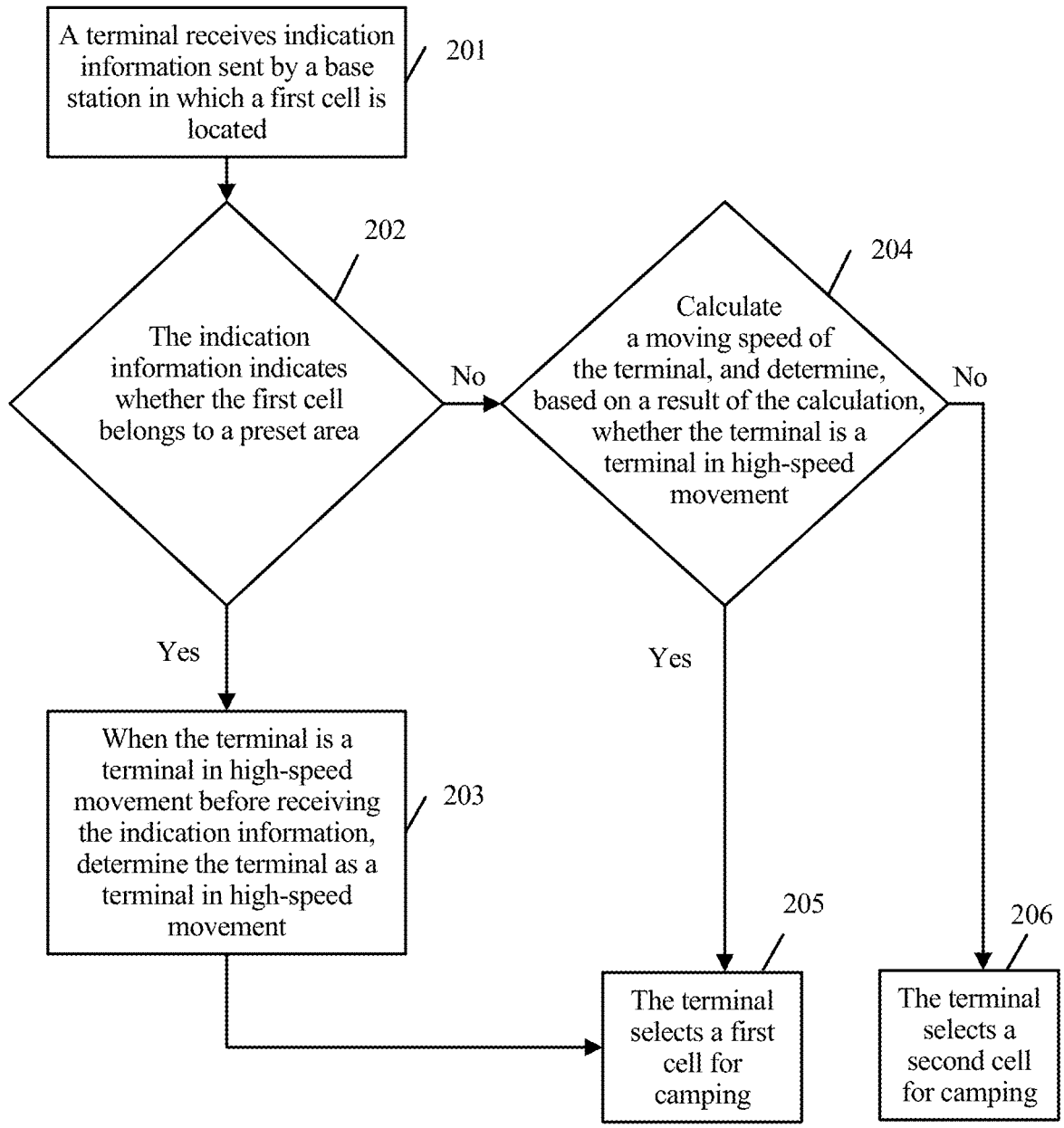
FIG. 2 is another schematic flowchart of an access control method according to an embodiment of this application.

FIG. 2 is another schematic flowchart of an access control method according to an embodiment of this application. This method includes but is not limited to the following steps:

201. A terminal receives indication information sent by a base station in which a first cell is located, where the indication information includes an identifier indicating whether the first cell belongs to a preset area.

202. When the indication information indicates that the first cell belongs to the preset area, step 203 is performed; or when the indication information indicates that the first cell does not belong to the preset area, step 204 is performed.

The embodiment of this application may be applied to an application scenario in which a terminal in an idle mode performs cell reselection.

The foregoing idle mode refers to a radio resource control (Radio Resource Control, RRC) state of a terminal on an air interface. A terminal in an idle mode camps on a cell, and because of mobility of a terminal, performs the cell reselection to change a cell on which the terminal is to camp. When downlink data arrives (triggered by a network) or uplink data arrives (triggered by a terminal) at the terminal in the idle mode, the terminal initiates a new RRC connection establishment on a cell on which the terminal currently camps to enter a connected mode. If a terminal in the connected mode has not transmitted data for a long time, the base station sends an RRC connection release message to the terminal, and therefore, the terminal enters the idle mode.

In the embodiment of this application, the foregoing preset area may be a high-speed train platform, a magnetic levitation train station, a metro station, a highway service area, or the like. This is not limited in this embodiment of this application. An example in which the preset area is a high-speed train platform is used for description.

203. When the terminal is a terminal in high-speed movement before receiving the indication information, the terminal is determined as a terminal in high-speed movement; and then, step 205 is performed.

204. The terminal calculates a moving speed of the terminal, and determines, based on a result of the calculation, whether the terminal is a terminal in high-speed movement; and if the terminal is a terminal in high-speed movement, step 205 is performed; or if the terminal is not a terminal in high-speed movement, step 206 is performed.

205. The terminal selects the first cell for camping, where the first cell is a high-speed train dedicated cell.

206. The terminal selects a second cell for camping, where the second cell is a common cell other than the high-speed train dedicated cell.

It can be learned that, if the terminal is a terminal in a high-speed train, when the high-speed train stops in a high-speed train platform area to which the first cell belongs, and if the terminal calculates a speed of the terminal, the terminal may determine the terminal as a terminal in non-high-speed movement and cannot select to camp on a high-speed train dedicated network. Therefore, the base station in which the first cell is located can send the indication information to the terminal to indicate that the base station belongs to the high-speed train platform area, and the terminal currently does not calculate the speed of the terminal, but directly determines the terminal as a terminal in high-speed movement based on a state before a stop at a station, and therefore can camp on the first cell (namely, the high-speed train dedicated cell).

Figure 3:
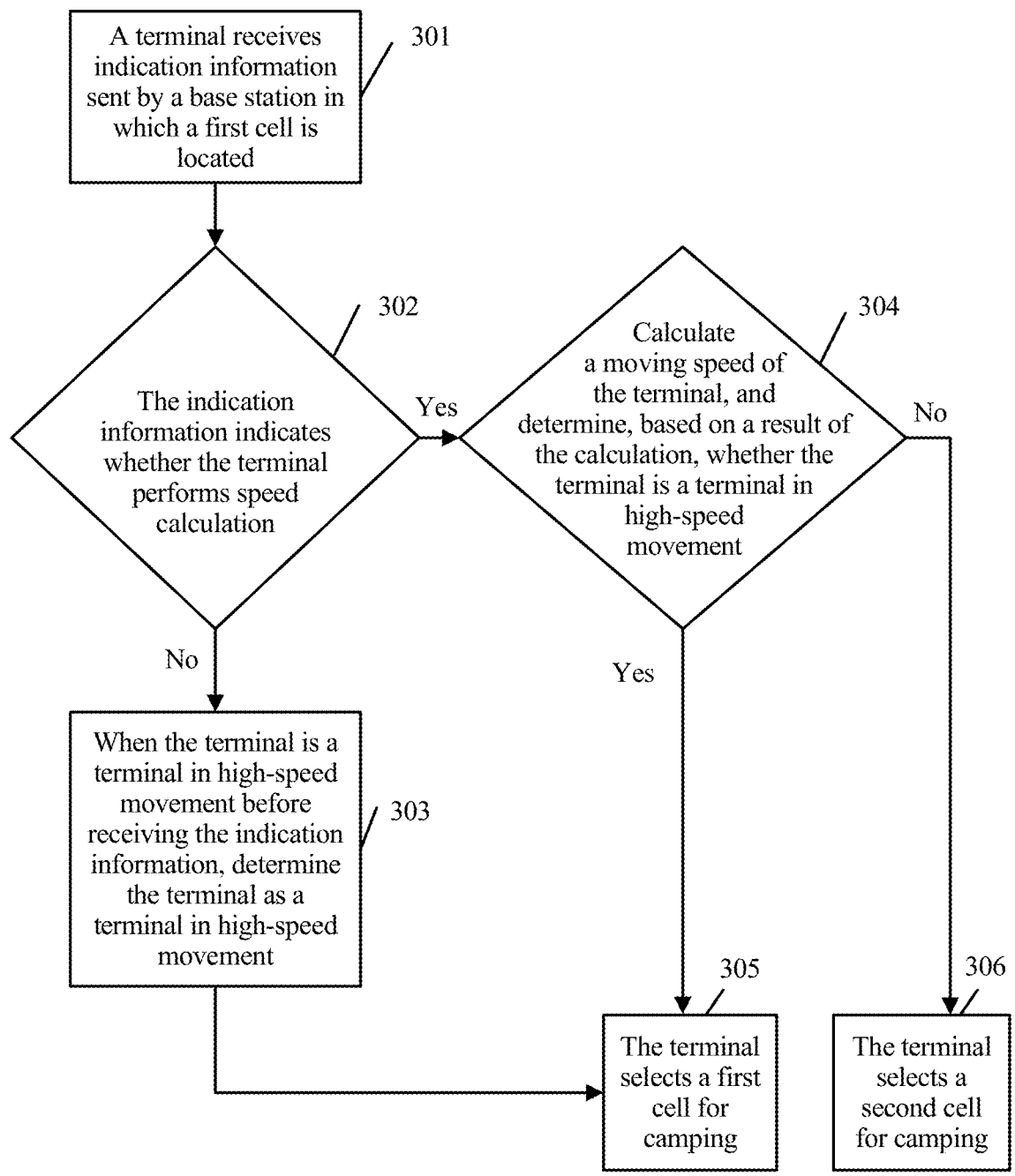
FIG. 3 is still another schematic flowchart of an access control method according to an embodiment of this application.

FIG. 3 is another schematic flowchart of an access control method according to an embodiment of this application. This method includes but is not limited to the following steps:

301. A terminal receives indication information sent by a base station in which a first cell is located, where the indication information includes an identifier indicating whether the terminal performs speed calculation.

302. When the indication information is used to instruct the terminal not to perform the speed calculation, step 303 is performed; or when the indication information is used to instruct the terminal to perform the speed calculation, step 304 is performed.

The embodiment of this application may be applied to an application scenario in which a terminal in an idle mode performs cell reselection.

303. When the terminal is a terminal in high-speed movement before receiving the indication information, the terminal is determined as a terminal in high-speed movement; and then, step 305 is performed.

304. The terminal calculates a speed of the terminal, and determines, based on a result of the speed calculation, whether the terminal is a terminal in high-speed movement; and if the terminal is a terminal in high-speed movement, step 305 is performed; or if the terminal is not a terminal in high-speed movement, step 306 is performed.

305. The terminal selects the first cell for camping, where the first cell is a high-speed train dedicated cell.

306. The terminal selects a second cell for camping, where the second cell is a common cell other than the dedicated cell.

It can be learned that, if the terminal is a terminal in a high-speed train, when the high-speed train stops in a high-speed train platform area to which the first cell belongs, and if the terminal calculates a speed of the terminal, the terminal may determine the terminal as a terminal in non-high-speed movement and cannot select the first cell (namely, the high-speed train dedicated cell) for camping. Therefore, the base station in which the first cell is located can send the indication information to the terminal to indicate that speed calculation is not performed for the first cell. The terminal currently does not calculate the speed of the terminal, but directly determines the terminal as a terminal in high-speed movement based on a state before a stop at a station, and therefore can camp on the first cell (namely, the high-speed train dedicated cell).

Figure 4:
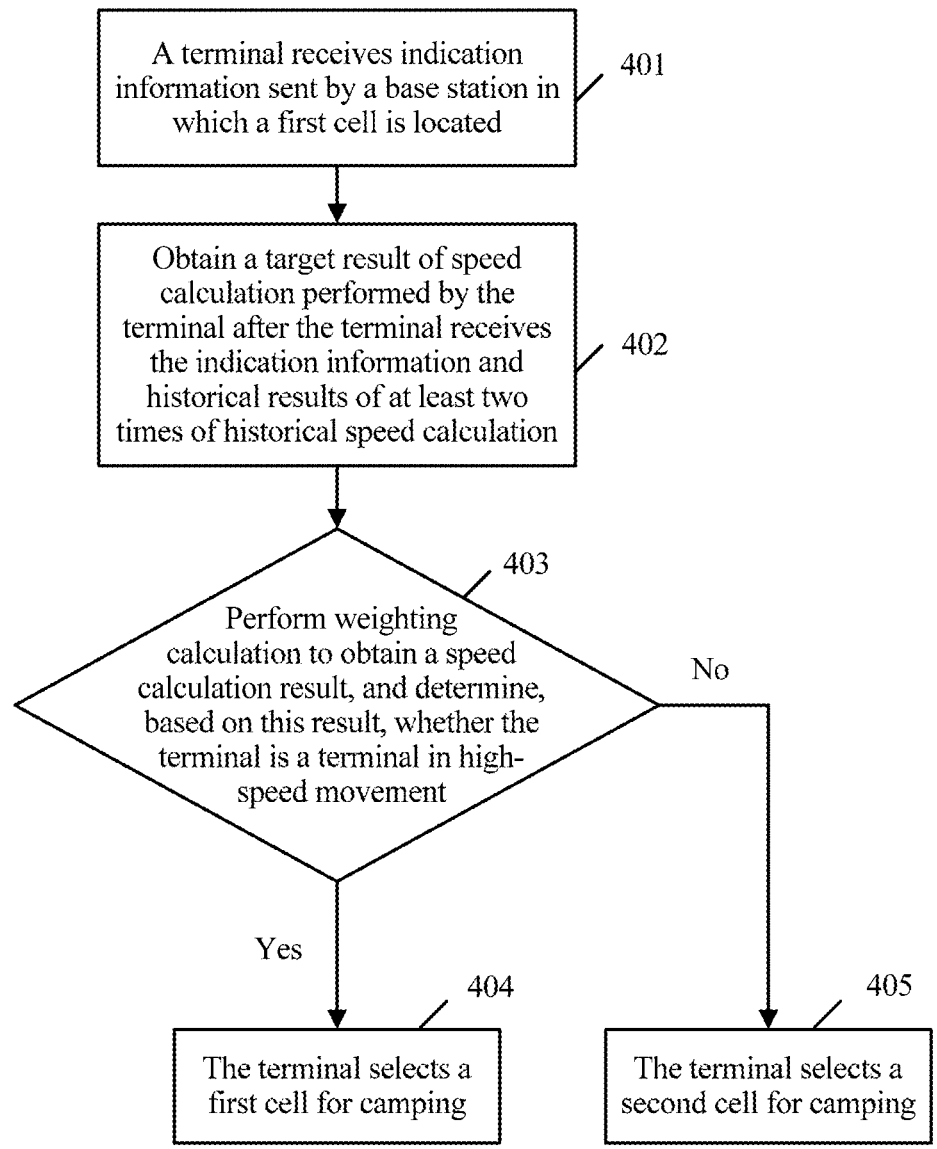
FIG. 4 is still another schematic flowchart of an access control method according to an embodiment of this application.

FIG. 4 is still another schematic flowchart of a control method according to an embodiment of this application. This method includes but is not limited to the following steps:

401. A terminal receives indication information sent by a base station in which a first cell is located, where the indication information includes first weight information.

The embodiment of this application may be applied to an application scenario in which a terminal in an idle mode performs cell reselection.

In an optional implementation, the foregoing first weight information may be sent by the base station to the terminal, or may be pre-stored in the terminal. When the terminal pre-stores the first weight information, the base station needs to send, to the terminal, only information indicating that the terminal performs weighting speed calculation.

402. The terminal obtains a target result of the speed calculation performed by the terminal after the terminal receives the indication information and historical results of at least two times of historical speed calculation, where the historical speed calculation is speed calculation recently performed by the terminal.

403. The terminal performs weighting calculation on the target result and the historical results based on the first weight information to obtain the weighting speed calculation result, and determines, based on the weighting speed calculation result, whether the terminal is a terminal in high-speed movement; and if the terminal is a terminal in high-speed movement, step 404 is performed; or if the terminal is not a terminal in high-speed movement, step 405 is performed.

404. The terminal selects the first cell for camping, where the first cell is a high-speed train dedicated cell.

405. The terminal selects a second cell for camping, where the second cell is a common cell other than the dedicated cell.

It can be learned that, if the terminal is a terminal in a high-speed train, when the high-speed train stops in a high-speed train platform area to which the first cell belongs, and if the terminal calculates a speed of the terminal, the terminal may determine the terminal as a terminal in non-high-speed movement and cannot select the first cell (namely, the high-speed train dedicated cell) for camping. Therefore, the base station in which the first cell is located may send the indication information to the terminal to reduce a weight that is of the speed calculation performed for the first cell and that is in a final speed calculation result. After performing the speed calculation in a weighting manner, the terminal may still determine the terminal as a terminal in high-speed movement, and therefore can camp on the first cell (namely, the high-speed train dedicated cell).

Figure 5:
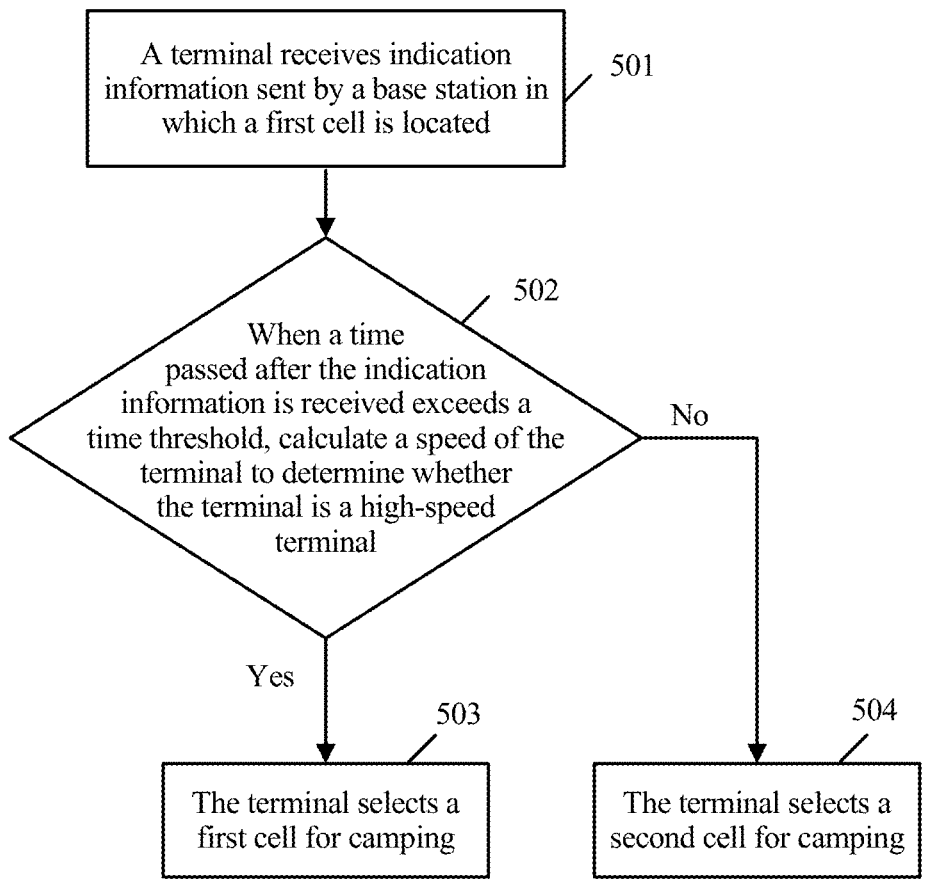
FIG. 5 is still another schematic flowchart of an access control method according to an embodiment of this application.

FIG. 5 is still another schematic flowchart of an access control method according to an embodiment of this application. This method includes but is not limited to the following steps:

501. A terminal receives indication information sent by a base station in which a first cell is located, where the indication information includes a first time threshold for indicating whether the terminal delays performing speed calculation.

The embodiment of this application may be applied to an application scenario in which a terminal in an idle mode performs cell reselection.

In an optional implementation, the foregoing first time threshold may alternatively be pre-stored in the terminal. In this case, the base station needs to send, to the terminal, only information indicating that the terminal delays performing the speed calculation.

502. When a time passed after the terminal receives the indication information exceeds the first time threshold, the terminal calculates a speed of the terminal to determine whether the terminal is a terminal in high-speed movement; and if the terminal is a terminal in high-speed movement, step 503 is performed; or if the terminal is not a terminal in high-speed movement, step 504 is performed.

503. The terminal selects the first cell for camping, where the first cell is a high-speed train dedicated cell.

504. The terminal selects a second cell for camping, where the second cell is a common cell other than the dedicated cell.

It can be learned that, if the terminal is a terminal in a high-speed train, when the high-speed train stops or runs at a low speed in a high-speed train platform area to which a first cell belongs, and if the terminal calculates a speed of the terminal, the terminal may determine the terminal as a terminal in non-high-speed movement and cannot select the first cell (namely, the high-speed train dedicated cell) for camping. Therefore, the base station in which the first cell is located can send the indication information to the terminal to enable the terminal to delay performing the speed calculation. The terminal performs the speed calculation after a station dwell time, may still determine the terminal as a terminal in high-speed movement, and therefore can camp on the first cell (namely, the high-speed train dedicated cell).

Figure 6:
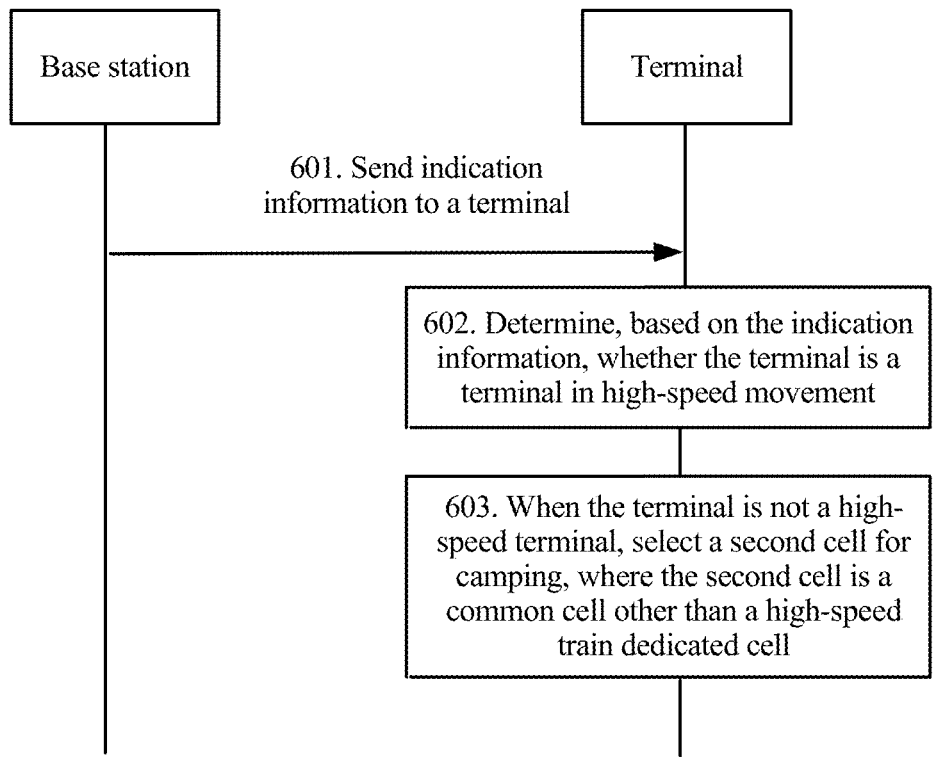
FIG. 6 is a schematic diagram of interaction between a base station and a terminal according to an embodiment of this application.

FIG. 6 is a schematic diagram of interaction between a base station and a terminal according to an embodiment of this application.

601. The base station sends indication information to the terminal.

Optionally, the base station obtains the indication information. For example, the base station generates the indication information based on information such as a geographical location of the base station. Alternatively, the base station may obtain the indication information in another manner, which is not specially limited.

In the embodiment of this application, the base station manages a first cell, and the first cell is a high-speed train dedicated cell. If the first cell belongs to a high-speed train platform area, when a high-speed train stops or runs at a low speed in a high-speed train platform area to which the first cell belongs, if the terminal calculates the speed of the terminal, the terminal may determine the terminal as a terminal in non-high-speed movement and cannot select the first cell (namely, a high-speed train dedicated cell) for camping. Therefore, a base station in which the first cell is located can send indication information to the terminal, and the indication information may include the following content.

The indication information includes an identifier indicating whether the first cell belongs to a preset area; or the indication information includes an identifier indicating whether the terminal performs the speed calculation; or the indication information includes first weight information, and the first weight information is a weight that is of the speed calculation performed by the terminal after the terminal receives the indication information and that is in a weighted speed calculation result; or the indication information includes an identifier indicating that the terminal performs the speed calculation through weighting calculation; or the indication information includes a first time threshold for indicating that the terminal delays performing the speed calculation; or the indication information includes an identifier indicating that the terminal delays the speed calculation.

602. The terminal determines, based on the indication information, whether the terminal is a terminal in high-speed movement.

603. When the terminal is not a terminal in high-speed movement, the terminal selects a second cell for camping, where the second cell is a common cell other than the high-speed train dedicated cell.

It can be learned that the base station in which the first cell is located may send the indication information to the terminal to enable the terminal to adjust the speed calculation (whether the speed calculation is performed, whether weighted speed calculation is performed, and an occasion on which the speed calculation is performed). Therefore, when being in a high-speed train, the terminal may still determine the terminal as a terminal in high-speed movement, and can camp on the first cell (namely, the high-speed train dedicated cell).

The foregoing describes in detail the methods in the embodiments of this application. The following describes apparatuses in the embodiments of this application.

Figure 7:
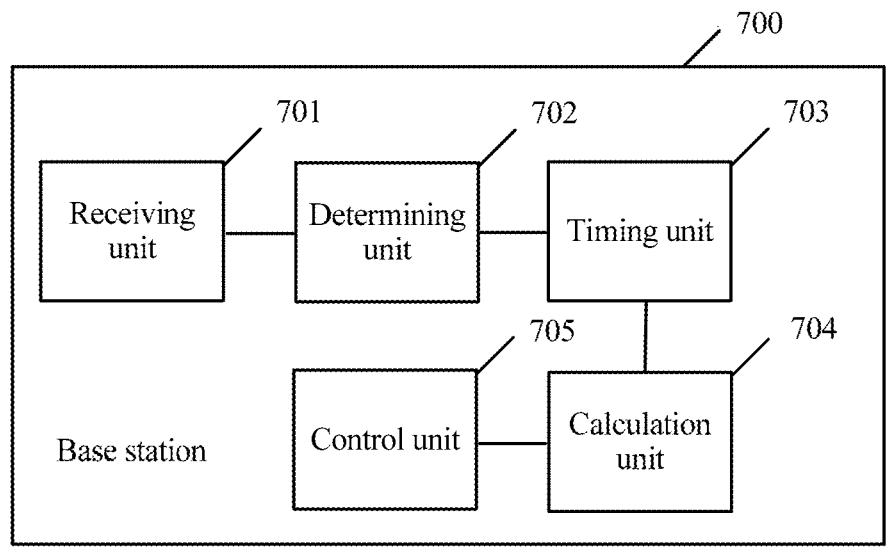
FIG. 7 is a schematic structural diagram of a base station 700 according to an embodiment of this application.

FIG. 7 is a schematic structural diagram of a base station 700 according to an embodiment of this application. As shown in FIG. 7, the base station 700 may include a receiving unit 701, a determining unit 702, a timing unit 703, a calculation unit 704, and a control unit 705. Detailed descriptions of all the units are as follows:

The receiving unit 701 is configured to receive indication information.

The determining unit 702 is configured to determine, based on the indication information received by the receiving unit 701, a terminal as a terminal in high-speed movement.

The timing unit 703 is configured to: after the determining unit 702 determines the terminal as a terminal in high-speed movement, perform a timing operation.

The calculation unit 704 is configured to: when a time of the timing operation performed by the timing unit 703 exceeds a preset time threshold, calculate a moving speed of the terminal.

The control unit 705 is configured to: when the moving speed of the terminal that is obtained by the calculation unit 704 through calculation is less than a preset speed threshold, forbid the terminal to access a cell of an access network device, where the cell of the access network device is a dedicated cell of a terminal located in a high-speed moving vehicle.

It should be noted that, for implementations of all of the foregoing units, reference may be made to corresponding descriptions in the method embodiments shown in FIG. 1A to FIG. 1D.

It can be learned that, by using the base station described in FIG. 7, a terminal located in a high-speed moving vehicle, including a terminal that is still located in a high-speed moving vehicle when the high-speed moving vehicle stops at a station and a terminal in non-high-speed movement, can be effectively identified, to avoid congestion of the dedicated cell that is caused when the terminal in non-high-speed movement camps on the foregoing dedicated cell, and avoid the following problem: The terminal located in the high-speed moving vehicle is determined as a terminal in non-high-speed movement and consequently is disconnected from or forbidden to access the dedicated cell.

Figure 8:
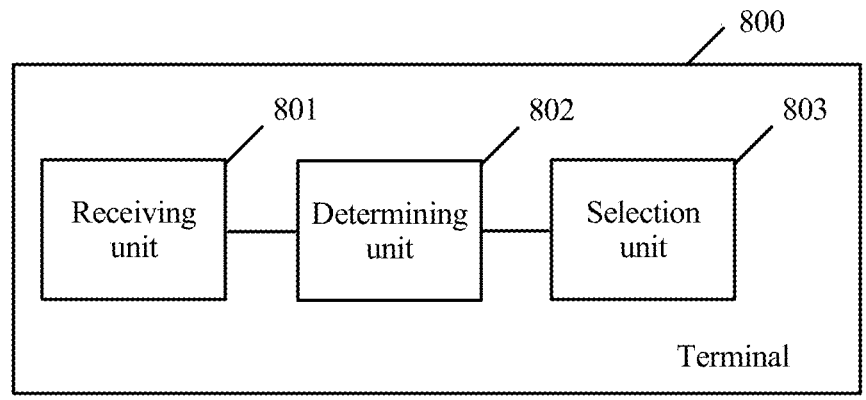
FIG. 8 is a schematic structural diagram of a terminal 800 according to an embodiment of this application.

FIG. 8 is a schematic structural diagram of a terminal 800 according to an embodiment of this application. As shown in FIG. 8, the terminal 800 may include a receiving unit 801, a determining unit 802, and a selection unit 803. Detailed descriptions of all the units are as follows:

The receiving unit 801 is configured to receive indication information sent by an access network device to which a first cell belongs, where the first cell is a dedicated cell of a terminal located in a high-speed moving vehicle The determining unit 802 is configured to determine, based on the indication information received by the receiving unit, whether the terminal is a terminal in high-speed movement.

The selection unit 803 is configured to: when the determining unit determines that the terminal is not a terminal in high-speed movement, select a second cell for camping, where the second cell is a common cell other than the dedicated cell.

It should be noted that, for implementations of all of the foregoing units, reference may be made to corresponding descriptions in the method embodiments shown in FIG. 2 to FIG. 5. Details are not described herein again.

Figure 9:
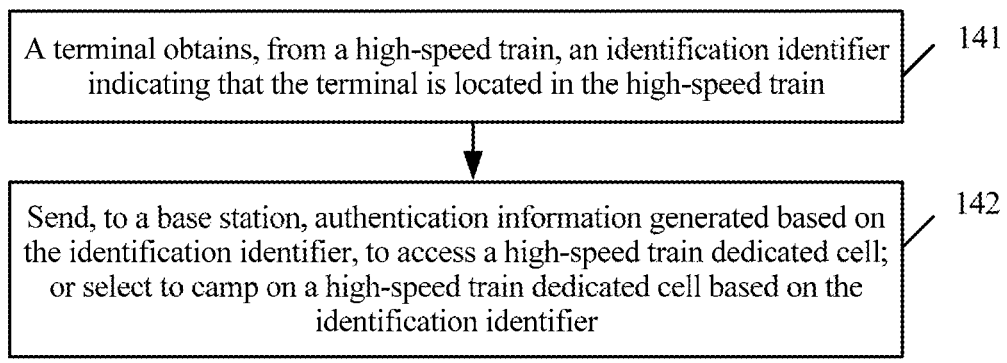
FIG. 9 is still another schematic flowchart of an access control method according to an embodiment of this application.

FIG. 9 is still another schematic flowchart of another access control method according to an embodiment of this application. This method includes but is not limited to the following steps:

141. A terminal obtains, from a high-speed train, an identification identifier indicating that the terminal is located in the high-speed train.

142. Send, to a base station, authentication information generated based on the identification identifier, to access a cell of the base station, where the cell of the base station is a high-speed train dedicated cell; or select to camp on the cell of the base station based on the identification identifier.

In an optional implementation, the foregoing identification identifier may be obtained by using two-dimensional code information provided in the high-speed train; or an identification device is disposed on a high-speed moving vehicle, to broadcast the identification identifier in a preset coverage area.

It can be learned that, by using the method described in FIG. 9, it can be determined, based on the identification identifier obtained in the high-speed train, that the terminal is located in the high-speed train, so that the terminal can access or camp on the high-speed train dedicated cell.

Figure 10:
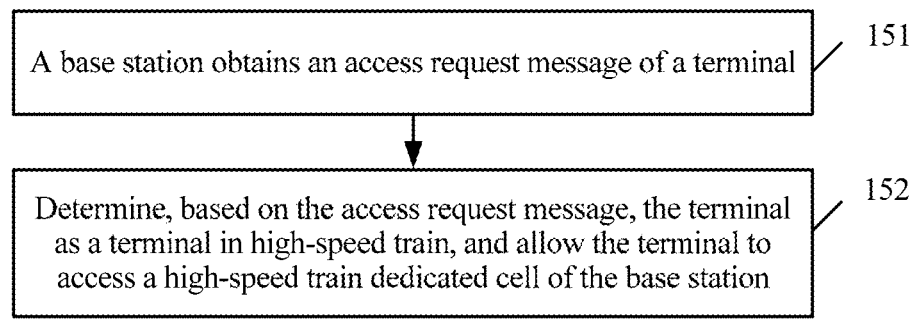
FIG. 10 is still another schematic flowchart of an access control method according to an embodiment of this application.

FIG. 10 is still another schematic flowchart of an access control method according to an embodiment of this application. This method includes but is not limited to the following steps:

151. A base station obtains an access request message of a terminal.

In an optional implementation, before obtaining the access request message of the terminal, the base station broadcasts, in a coverage area of the base station, a prompt message that includes an equivalent public land mobile network PLMN, where the equivalent PLMN is used to identify a cell of the base station as a high-speed train dedicated cell.

After receiving the prompt message, the terminal sends the foregoing access request message to the base station.

152. Determine, based on the access request message, the terminal as a terminal in a high-speed train, and allow the terminal to access the cell of the base station, where the cell of the base station is the high-speed train dedicated cell.

In an optional implementation, the base station obtains, based on the access request message, user registration information (for example, a mobile number or an identity card number of a user) of the terminal from a home subscriber server HSS of the terminal; then, whether an entry of the user corresponding to the terminal exists is queried in a database of a corresponding high-speed train based on the user registration information, that is, whether high-speed train ticket buying information exists in a database of a high-speed train is queried; and if the high-speed train ticket buying information of the user exists, a terminal in a train taking time is determined as a terminal in a high-speed train based on the train taking time of the user.

Figure 11:
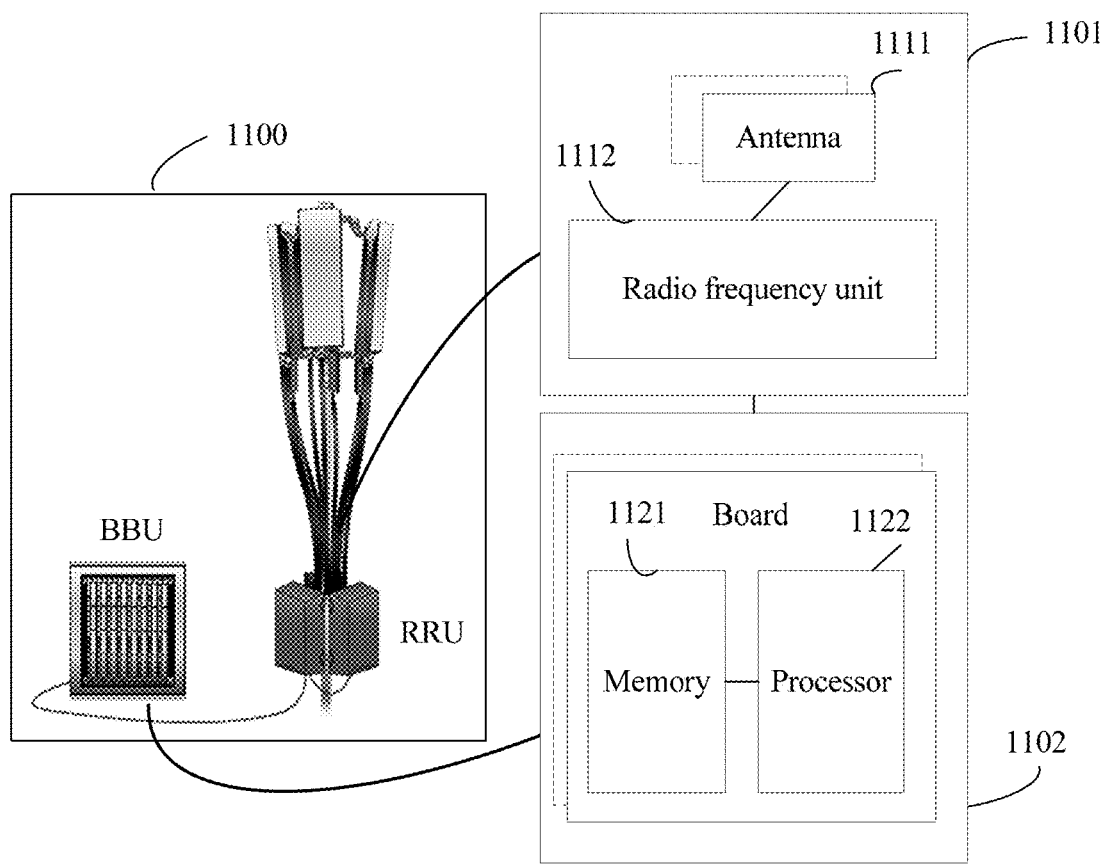
FIG. 11 is a schematic structural diagram of a base station 1100 according to an embodiment of this application.

FIG. 11 is another schematic structural diagram of a base station 1100 according to an embodiment of this application. The base station may perform operations of the base stations in the methods shown in FIG. 1A to FIG. 1D, or the base station may perform an operation of the base station in the method shown in FIG. 10.

The base station 1100 includes one or more remote radio frequency units (remote radio unit, RRU) 1101 and one or more baseband units (baseband unit, BBU) 1102. The RRU 1101 may be referred to as a transceiver unit, a transceiver, a transceiver circuit, a transceiver, or the like, and may include at least one antenna 1111 and a radio frequency unit 1112. The RRU 1101 is mainly configured to: send and receive a radio frequency signal and perform conversion between a radio frequency signal and a baseband signal, for example, is configured to send, to user equipment, the indication information described in the foregoing embodiments. The BBU 1102 is mainly configured to: perform baseband processing, control a base station, and the like. The RRU 1101 and the BBU 1102 may be physically disposed together, or may be physically separated, to be specific, in a distributed base station.

The BBU 111102 is a control center of the base station, may also be referred to as a processing unit, and is mainly configured to perform baseband processing functions such as channel coding, multiplexing, modulation, and spreading. For example, the BBU (processing unit) may be configured to control the base station to perform the procedures shown in FIG. 1A to FIG. 1D.

In an example, the BBU 1102 may include one or more boards, and a plurality of boards may jointly support a radio access network (such as an LTE network) of a single access standard, or may separately support radio access networks of different access standards. The BBU 1102 further includes a memory 1121 and a processor 1122. The memory 1121 is configured to store a necessary message and necessary data. The processor 1122 is configured to control the base station to perform a necessary action, for example, control the base station to perform the procedures shown in FIG. 1A to FIG. 1D. The memory 1121 and the processor 1122 may serve one or more boards. In other words, a memory and a processor may be disposed separately on each board, or a plurality of boards may share a same memory and processor. In addition, a necessary circuit is further disposed on each board.

Figure 12:
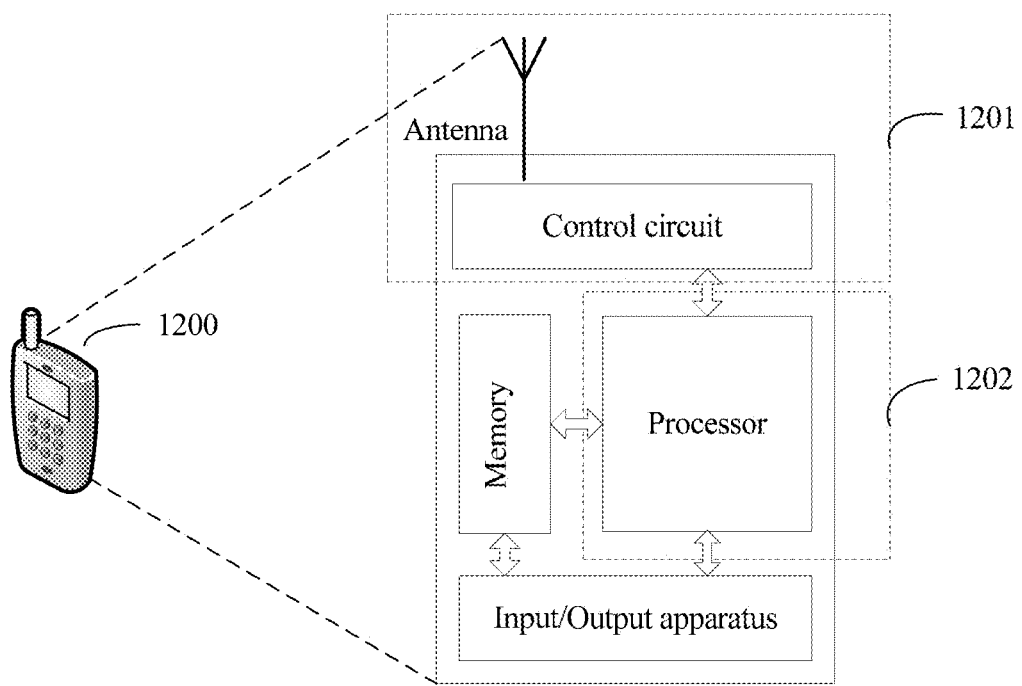
FIG. 12 is a schematic structural diagram of a terminal 1200 according to an embodiment of this application.

FIG. 12 is a schematic structural diagram of a terminal 1200 according to an embodiment of this application. The terminal may perform operations of the terminals in the methods shown in FIG. 2 to FIG. 6, or the terminal may perform operations of the terminal in the method shown in FIG. 9.

For ease of description, FIG. 12 shows only main components of the terminal. As shown in FIG. 12, the terminal 1200 includes a processor, a memory, a control circuit, an antenna, and an input/output apparatus. The processor is mainly configured to: process a communication protocol and communication data, control entire user equipment, execute a software program, and process data of a software program, for example, is configured to support the terminal in performing the procedures shown in FIG. 2 to FIG. 5. The memory is mainly configured to store a software program and data, for example, store the second time threshold and the second weight information that are described in the foregoing embodiments. The control circuit is mainly configured to perform conversion between a baseband signal and a radio frequency signal and process radio frequency signal. A combination of the control circuit and the antenna may also be referred to as a transceiver that is mainly configured to send and receive a radio frequency signal in an electromagnetic wave form, for example, may be configured to perform step 201 in FIG. 2, in other words, receives the indication information sent by the base station in which the first cell is located. For details, refer to the foregoing description of a related part. The terminal 1200 further includes the input/output apparatus, such as a touchscreen, a display screen, or a keyboard, and is mainly configured to: receive data entered by a user, and output data to the user.

After the terminal is powered on, the processor may read a software program in a storage unit, interpret and execute a software program, and process data of a software program. When data needs to be transmitted wirelessly, after performing baseband processing on to-be-sent data, the processor outputs a baseband signal to a radio frequency circuit. After performing radio frequency processing on the baseband signal, the radio frequency circuit sends a radio frequency signal in an electromagnetic wave form through the antenna. When data is sent to the terminal, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 12 shows only one memory and one processor. Actually, the terminal may have a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data. The central processing unit is mainly configured to: control the entire terminal, execute a software program, and process data of a software program. The processor in FIG. 12 integrates functions of the baseband processor and the central processing unit. A person skilled in the art may understand that the baseband processor and the central processing unit may be individually separate processors, and are interconnected by using a technology such as a bus. A person skilled in the art may understand that the terminal may include a plurality of baseband processors to adapt to different network standards, and the terminal may include a plurality of central processing units to enhance a processing capability of the terminal. All the parts of the terminal may be connected by using various buses. The baseband processor may also be expressed as a baseband processing circuit or a baseband processing chip. The central processing unit may also be expressed as a central processing circuit or a central processing chip. A function of processing a communication protocol and communication data may be embedded into the processor, or may be stored in a storage unit in a form of a software program. The processor executes a software program to implement a baseband processing function.

For example, in the embodiment of the present invention, an antenna and a control circuit that have receiving and sending functions may be considered as the transceiver unit 1201 of the terminal 1200, and a processor having a processing function may be considered as the processing unit 1202 of the terminal 1200. As shown in FIG. 12, the terminal 1200 includes the transceiver unit 1201 and the processing unit 1202. The transceiver unit may also be referred to as a transceiver, a transceiver, a transceiver apparatus, or the like. Optionally, a component that is in the transceiver unit 1201 and that is configured to implement a receiving function may be considered as a receiving unit, and a component that is in the transceiver unit 1201 and that is configured to implement a sending function may be considered as a sending unit. In other words, the transceiver unit 1201 includes a receiving unit and a sending unit. For example, the receiving unit may also be referred to as a receiver, a receiver, or a receiver circuit, and the sending unit may be referred to as a transmitter, a transmitter, or a transmitter circuit.

In conclusion, by implementing the embodiments of this application, a terminal located in a high-speed moving vehicle (when the high-speed moving vehicle stops at a station) and a terminal in non-high-speed movement can be effectively identified, to avoid congestion of the dedicated cell that is caused when the terminal in non-high-speed movement maintains or establishes a radio resource control connection to a dedicated cell of a terminal in a high-speed moving vehicle.

All or some of the foregoing embodiments may be implemented by software, hardware, firmware, or any combination thereof. When software is used to implement the embodiments, all or some of the embodiments may be implemented in a form of a computer program product. The computer program product includes one or more computer messages. When the computer program message is loaded and executed on a computer, all or some of the procedures or functions described in the embodiments of the present invention are generated. The computer may be a general-purpose computer, a special-purpose computer, a computer network, or another programmable apparatus. The computer message may be stored in a computer readable storage medium, or may be transmitted from one computer readable storage medium to another computer readable storage medium. For example, the computer message may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

In several embodiments provided in this application, it should be understood that the disclosed system, device, and method may be implemented in other manners without departing from the scope of this application. For example, the embodiments described above are merely examples. For example, division of a modules or the units is merely logical function division, and there may be another division manner in actual implementation. For example, a plurality of units or components may be combined or integrated into another system, or some features may be ignored, or not performed. The foregoing units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of the embodiments. A person of ordinary skill in the art may understand and implement the embodiments of this application without creative efforts.

In addition, the schematic diagrams illustrating the system, the device, the method, and different embodiments may be combined or integrated with another system, module, technology, or method without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access control method, comprising:
   receiving, by an access network device, indication information;
   if the indication information identifies the access network device is in a high-speed movement, performing, by the access network device, a timing operation;
   when a time of the timing operation exceeds a preset time threshold, calculating, by the access network device, a moving speed of the terminal; and
   when the moving speed of the terminal is less than a preset speed threshold, forbidding, by the access network device, the terminal to access a cell of the access network device, wherein the cell of the access network device is a dedicated cell of a terminal located in a high-speed moving vehicle.

2. The method according to claim 1, wherein the forbidding, by the access network device, the terminal to access a cell of the access network device comprises:
   forbidding, by the access network device, the terminal to be handed over to the cell of the access network device; or
   disconnecting, by the access network device, the terminal from the cell of the access network device.

3. The method according to claim 1, wherein after the calculating, by the access network device, a moving speed of the terminal, the method further comprises:
   when the moving speed of the terminal is greater than or equal to the preset speed threshold, allowing, by the access network device, the terminal to access the cell of the access network device; or when the moving speed of the terminal is greater than or equal to the preset speed threshold, maintaining, by the access network device, a connection between the terminal and the cell of the access network device.

4. The method according to claim 1, wherein the indication information comprises an identifier indicating that the terminal is a terminal in high-speed movement; and
   the determining, by the access network device, a terminal as a terminal in high-speed movement based on the indication information comprises:
      obtaining, by the access network device, the identifier in the indication information to determine the terminal as a terminal in high-speed movement.

5. The method according to claim 1, wherein the indication information comprises identifiers of at least two historical cells, types of the at least two historical cells, and time of maintaining radio resource control connections to the at least two historical cells; and when the access network device receives the indication information, the historical cell is a second cell to which the terminal is maintaining a radio resource control connection or a first cell to which the terminal maintains a radio resource control connection before maintaining the radio resource control connection to the second cell; and
   the determining, by the access network device, a terminal as a terminal in high-speed movement based on the indication information comprises:
      calculating, by the access network device, the moving speed of the terminal based on the identifiers of the at least two historical cells, the types of the at least two historical cells, and the time of maintaining the radio resource control connections to the at least two historical cells, and determining the terminal as a terminal in high-speed movement based on the moving speed.

6. The method according to claim 1, wherein the indication information comprises attributed of at least two historical cells, the attribute of the historical cell is used to indicate whether the historical cell is a dedicated cell of a terminal located in a high-speed moving vehicle, and when the access network device receives the indication information, the historical cell is a second cell to which the terminal is maintaining a radio resource control connection or a first cell to which the terminal maintains a radio resource control connection before maintaining the radio resource control connection to the second cell; and
   the determining, by the access network device, a terminal as a terminal in high-speed movement based on the indication information comprises:
      determining, by the access network device, the terminal as a terminal in high-speed movement based on the attribute of the historical cell.

7. A communication apparatus, comprising at least one processor coupled with a non-transitory storage medium storing executable instructions that, when executed by the at least one processor, cause an access network device to:
   receive indication information;
   if the indication information identifies that the access network device is in a high-speed movement, perform a timing operation;
   when a time of the timing operation of the timing unit exceeds a preset time threshold, calculate a moving speed of the terminal; and
   when the moving speed of the terminal that is obtained by the calculation unit through calculation is less than a preset speed threshold, forbid the terminal to access a cell of the access network device, wherein the cell of the access network device is a dedicated cell of a terminal located in a high-speed moving vehicle.

8. The access network device according to claim 7, wherein forbidding the terminal to access a cell of the access network device comprises:
   forbidding the terminal to be handed over to the cell of the access network device; or
   disconnecting the terminal from the cell of the access network device.

9. The access network device according to claim 7, wherein the instructions when executed by the processor, further causing the access network device to:
   when the moving speed of the terminal that is obtained by the calculation unit through calculation is greater than or equal to the preset speed threshold, allow the terminal to access the cell of the access network device; or when the moving speed of the terminal that is obtained by the calculation unit through calculation is greater than or equal to the preset speed threshold, maintain a connection between the terminal and the cell of the access network device.

10. The access network device according to claim 7, wherein the indication information comprises an identifier indicating that the terminal is a terminal in high-speed movement; and the determining, a terminal as a terminal in high-speed movement based on the indication information comprises:

obtaining the identifier in the indication information to determine the terminal as a terminal in high-speed movement.

11. The access network device according to claim 7, wherein the indication information comprises identifiers of at least two historical cells, types of the at least two historical cells, and time of maintaining radio resource control connections to the at least two historical cells; and when the access network device receives the indication information, the historical cell is a second cell to which the terminal is maintaining a radio resource control connection or a first cell to which the terminal maintains a radio resource control connection before maintaining the radio resource control connection to the second cell;

the determining, a terminal as a terminal in high-speed movement based on the indication information comprises:

calculate the moving speed of the terminal based on the identifiers of the at least two historical cells, the types of the at least two historical cells, and the time of maintaining the radio resource control connections to the at least two historical cells; and the determining unit is configured to determine the terminal as a terminal in high-speed movement based on the moving speed.

12. The access network device according to claim 7, wherein the indication information comprises attributes of at least two historical cells, the attribute of the historical cell is used to indicate whether the historical cell is a dedicated cell of a terminal located in a high-speed moving vehicle, and when the access network device receives the indication information, the historical cell is a second cell to which the terminal is maintaining a radio resource control connection or a first cell to which the terminal maintains a radio resource control connection before maintaining the radio resource control connection to the second cell; and the determining, a terminal as a terminal in high-speed movement based on the indication information comprises: determining the terminal as a terminal in high-speed movement based on the attribute of the historical cell.

* * * * *